United States Patent
Sugihara et al.

(10) Patent No.: US 7,859,828 B2
(45) Date of Patent: Dec. 28, 2010

(54) ELECTROLYTIC SOLUTION FOR ELECTROLYTIC CAPACITOR, AND ELECTROLYTIC CAPACITOR USING THE SAME

(75) Inventors: Yukiyasu Sugihara, Yamaguchi (JP); Keiko Hamada, Osaka (JP); Hiroyuki Matsuura, Shiga (JP); Shigetaka Furusawa, Kyoto (JP); Hiroki Kusayanagi, Kanagawa (JP); Shinya Taguchi, Fukuoka (JP)

(73) Assignee: Panasonic Corporation, Osaka (JP)

( * ) Notice: Subject to any disclaimer, the term of this patent is extended or adjusted under 35 U.S.C. 154(b) by 306 days.

(21) Appl. No.: 11/662,065

(22) PCT Filed: Sep. 6, 2005

(86) PCT No.: PCT/JP2005/016299
§ 371 (c)(1),
(2), (4) Date: Mar. 7, 2007

(87) PCT Pub. No.: WO2006/028072
PCT Pub. Date: Mar. 16, 2006

(65) Prior Publication Data
US 2008/0316679 A1    Dec. 25, 2008

(30) Foreign Application Priority Data
Sep. 7, 2004  (JP) .............................. 2004-259224
Mar. 22, 2005  (JP) .............................. 2005-081656

(51) Int. Cl.
*H01G 9/02*    (2006.01)
*H01M 6/04*    (2006.01)
(52) U.S. Cl. ...................... 361/504; 252/62.2
(58) Field of Classification Search ............. 361/504, 361/505, 507; 252/62.2
See application file for complete search history.

(56) References Cited

U.S. PATENT DOCUMENTS 3,607,751 A * 9/1971 Yoshimura .............. 252/62.2

(Continued)

FOREIGN PATENT DOCUMENTS

CN    1467764    1/2004

(Continued)

OTHER PUBLICATIONS

CHEM Industry.com—chemical information of p-quinone.*

(Continued)

*Primary Examiner*—Eric Thomas
*Assistant Examiner*—David M Sinclair
(74) *Attorney, Agent, or Firm*—Wenderoth, Lind & Ponack, L.L.P.

(57) ABSTRACT

An electrolytic solution for use in an electrolytic capacitor including a capacitor element and a casing containing the capacitor element, the capacitor element including a pair of electrodes, and a conductive separator (E) which is formed with a conductive polymer layer (F) containing a dopant agent (H) on its surface and is interposed between the pair of electrodes, the conductive separator (E) and the pair of electrodes being rolled up in an overlapped state with each other, and spaces between the pair of electrodes being impregnated with the electrolytic solution, wherein an acid component (D) and a base component (C) as electrolytic components to be contained in the electrolytic solution are at such a molar ratio that the acid component (D) is excessive. By use of the electrolytic solution, increase in the ESR with the elapse of time in an electrolytic capacitor is suppressed.

4 Claims, 2 Drawing Sheets

U.S. PATENT DOCUMENTS

| | | | |
|---|---|---|---|
| 4,580,194 A | | 4/1986 | Finkelstein et al. |
| 4,715,976 A | * | 12/1987 | Mori et al. ................. 252/62.2 |
| 4,915,861 A | * | 4/1990 | Yokoyama et al. ......... 252/62.2 |
| 5,870,275 A | * | 2/1999 | Shiono et al. ............... 361/504 |
| 6,307,735 B1 | * | 10/2001 | Saito et al. .................. 361/517 |
| 6,514,431 B1 | * | 2/2003 | Nishikitani et al. ......... 252/500 |
| 2003/0090857 A1 | * | 5/2003 | Liu et al. .................... 361/502 |

FOREIGN PATENT DOCUMENTS

| | | | |
|---|---|---|---|
| JP | 61-99322 | | 5/1986 |
| JP | 63291414 A | * | 11/1988 |
| JP | 64-39710 | | 2/1989 |
| JP | 64-90517 | | 4/1989 |
| JP | 01103820 A | * | 4/1989 |
| JP | 1-167965 | | 11/1989 |
| JP | 02277209 A | * | 11/1990 |
| JP | 03068121 A | * | 3/1991 |
| JP | 7-192536 | | 7/1995 |
| JP | 7-283086 | | 10/1995 |
| JP | 11186110 A | * | 7/1999 |
| JP | 2003-22938 | | 1/2003 |
| JP | 2004165332 A | * | 6/2004 |
| JP | 2004-214637 | | 7/2004 |
| WO | 95/15572 | | 6/1995 |

OTHER PUBLICATIONS

English translation of Office Action issued Oct. 9, 2009 in Chinese Application corresponding to present U.S. Application.
English translation of Office Action issued Nov. 17, 2009 in Japanese Application corresponding to present U.S. Application.

* cited by examiner

ELECTROLYTIC SOLUTION FOR ELECTROLYTIC CAPACITOR, AND ELECTROLYTIC CAPACITOR USING THE SAME

BACKGROUND OF THE INVENTION

1. Field of the Invention

The present invention relates to an electrolytic solution for use in an electrolytic capacitor which includes a conductive separator formed with a conductive polymer layer on its surface, and an electrolytic capacitor using the same.

2. Prior Art

As various electronic devices require higher frequencies, the demand for a large-capacity electrolytic capacitor having excellent equivalent series resistance (hereinafter also referred to as ESR) characteristic at high frequency areas has grown.

In recent years, as the aforementioned electrolytic capacitor, there has been proposed an electrolytic capacitor having a structure in which a conductive separator formed with a conductive polymer layer on its surface is interposed between a pair of electrodes.

For example, Patent Exhibit 1 below proposes to improve the ESR characteristic by giving electric conduction to the separator of the electrolytic capacitor by means of a conductive polymer.

On the other hand, there has conventionally been developed an electrolytic solution for electrolytic capacitor (hereinafter, also simply referred to as an electrolytic solution) for reducing the energy loss or improving the ESR characteristic of the electrolytic capacitor. As such an electrolytic solution, an electrolytic solution having high electric conductivity has been proposed. Specific example thereof is a so-called amidine-based electrolytic solution such as described in Patent Exhibit 2. This electrolytic solution contains carboxylic acid salt of a quaternary compound having alkyl-substituted amidine groups as an electrolyte. However, the use of only said electrolytic solution having high electric conductivity is still insufficient to improve said ESR characteristic and the like.

In an attempt to further reduce the energy loss and improve the ESR characteristic, the present inventors employed the amidine-based electrolytic solution such as described in Patent Exhibit 2 to the electrolytic capacitor having the ESR characteristic which has been improved by giving conduction to the separator such as described in Patent Exhibit 1 by means of a conductive polymer. However, there arose a problem that the ESR of the electrolytic capacitor increased.

[Patent Exhibit 1] Japanese Unexamined Patent Publication No. 1-90517

[Patent Exhibit 2] International Unexamined Patent Publication No. 95/15572, pamphlet

SUMMARY OF THE INVENTION

The present inventors have considered the cause of the problem of the increase in the ESR with the elapse of time occurring in the electrolytic capacitor provided with a conductive separator as follows: a dopant agent gradually comes out of the conductive polymer layer containing the dopant agent into the electrolytic solution (hereinafter also referred to a dedoping phenomenon). Thus, the conductive polymer deteriorates and, as a result, the electric conductivity of the conductive polymer layer gradually decreases. Based on this idea, the present inventors have found the following means to solve the problem.

The first electrolytic solution for electrolytic capacitor of the present invention is an electrolytic solution for use in an electrolytic capacitor including a capacitor element and a casing containing said capacitor element, said capacitor element including a pair of electrodes, and a conductive separator (E) which is formed with a conductive polymer layer (F) containing a dopant agent (H) on its surface and is interposed between said pair of electrodes, said conductive separator (E) and said pair of electrodes being rolled up in an overlapped state with each other, and spaces between said pair of electrodes being impregnated with the electrolytic solution for electrolytic capacitor, wherein an acid component (D) and a base component (C) as electrolytic components to be contained in said electrolytic solution for electrolytic capacitor are at such a molar ratio that said acid component (D) is excessive.

Further, the electrolytic capacitor of the present invention is an electrolytic capacitor comprising a capacitor element and a casing containing said capacitor element, said capacitor element including a pair of electrodes, and a conductive separator (E) which is formed with a conductive polymer layer (F) containing a dopant agent (H) on its surface and is interposed between said pair of electrodes, said conductive separator (E) and said pair of electrodes being rolled up in an overlapped state with each other, and spaces between said pair of electrodes being impregnated with the electrolytic solution for electrolytic capacitor, wherein the aforementioned electrolytic solution for electrolytic capacitor is used.

Further, the second electrolytic solution for electrolytic capacitor of the present invention is an electrolytic solution for use in an electrolytic capacitor including a capacitor element and a casing containing said capacitor element, said capacitor element including a pair of electrodes composed of an anode chemical foil and a cathode foil, and a p-type doping conductive separator (E') which is formed with a p-type doping conductive polymer layer (F') containing a p-type dopant agent (H') on its surface and is interposed between said pair of electrodes, said p-type doping conductive separator (E') and said pair of electrodes being rolled up in an overlapped state with each other, and spaces between said pair of electrodes being impregnated with the electrolytic solution for electrolytic capacitor, wherein said electrolytic solution for electrolytic capacitor contains a component (A0) having reduction potential of $-1.6$ to $0V$ when measured in the following measuring method:

a method for measuring the reduction potential: into $\gamma$-butyrolactone into which tetraethylammonium fluoroborate is dissolved at 0.23 mol/L as a supporting electrolyte, a component (A0) is dissolved at 0.1 mol/L, and the potential thereof is measured at the time when the current at $-0.2\,\mu A$ flowed by means of the convective cyclic voltammetry measuring method using a Grassi carbon electrode ($\phi$ 1.0 mm) as an active electrode, a ($Ag/Ag^+$) electrode as a reference electrode, and a platinum electrode as a counter electrode.

Further, the electrolytic capacitor of the present invention is an electrolytic capacitor comprising a capacitor element and a casing containing said capacitor element, said capacitor element including a pair of electrodes composed of an anode chemical foil and a cathode foil, and a p-type doping conductive separator (E') which is formed with a p-type doping conductive polymer layer (F') containing a p-type dopant agent (H') on its surface and is interposed between said pair of electrodes, said p-type doping conductive separator (E') and said pair of electrodes being rolled up in an overlapped state with each other, and spaces between said pair of electrodes being impregnated with the electrolytic solution for electrolytic capacitor, wherein the second electrolytic solution for electrolytic capacitor is used.

DESCRIPTION OF THE PREFERRED EMBODIMENTS

Embodiments of an electrolytic solution for electrolytic capacitor and an electrolytic capacitor using the same according to the present invention will be described referring to FIG. 1.

Figure 1:
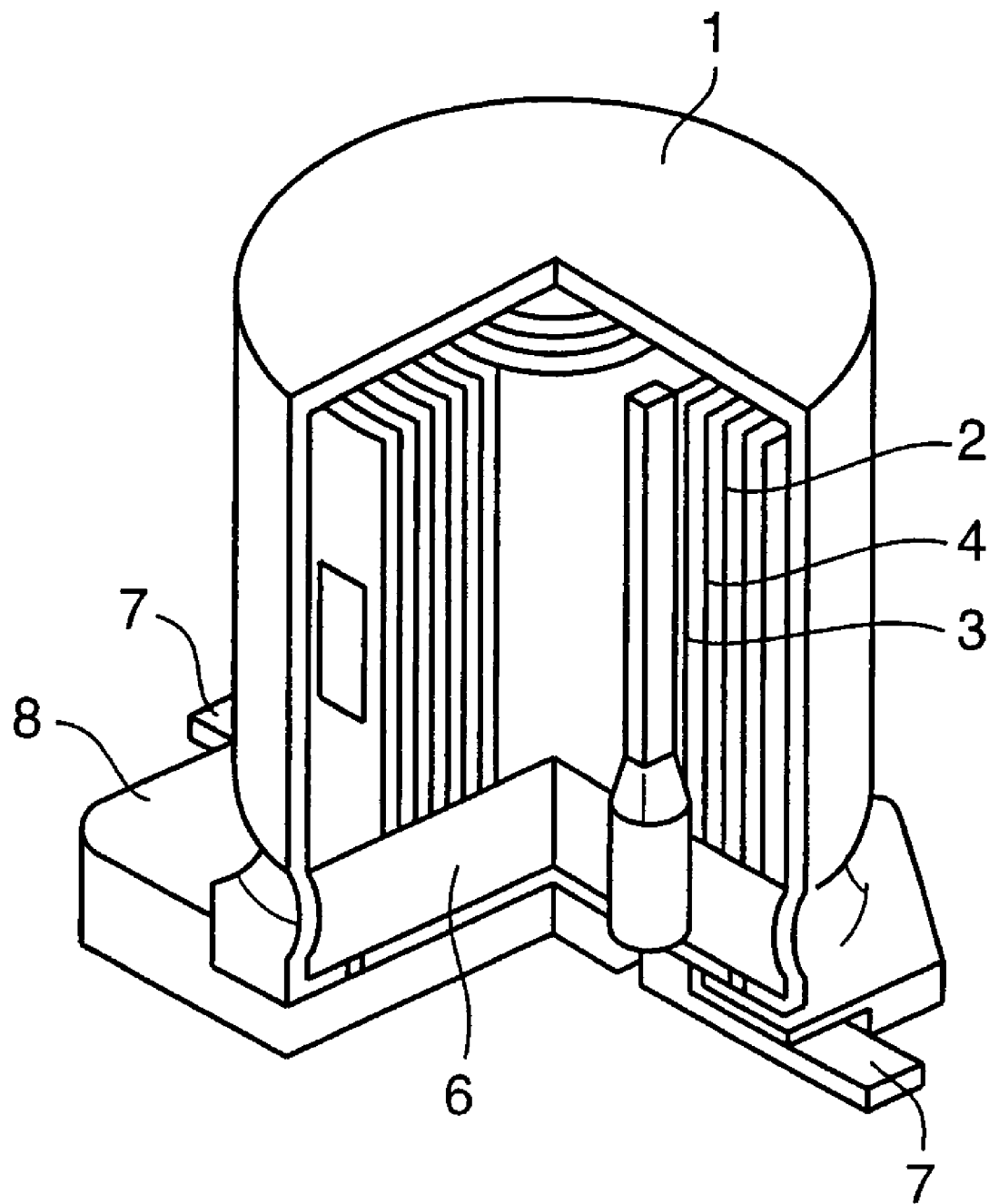
FIG. 1 is a partially sectional perspective view showing a structure of an electrolytic capacitor according to an embodiment of the present invention.

FIG. 1 is a partially sectional perspective view showing an exemplary structure of an electrolytic capacitor of the present invention.

An electrolytic capacitor shown in FIG. 1 includes a pair of electrodes each made of aluminum foil, that is, an anode electrode 2 and a cathode electrode 3. The anode electrode 2 and the cathode electrode 3, and a conductive separator (E) 4 interposed between two electrodes are rolled up in an overlapped state with each other. Then, the electrolytic solution for electrolytic capacitor is contained between said electrodes, so as to create a capacitor element.

Said capacitor element is housed in a casing 1 which is in the shape of cylinder with a bottom and is made of aluminum, and the opening of the casing 1 is sealed with a sealing member 6. The anode electrode 2 and the cathode electrode 3 are connected with an external conduction lead 7 so as to be led to the outside. An insulating seat plate 8 is provided in such a manner as to be surface-mounted to the electrolytic capacitor.

Figure 2:
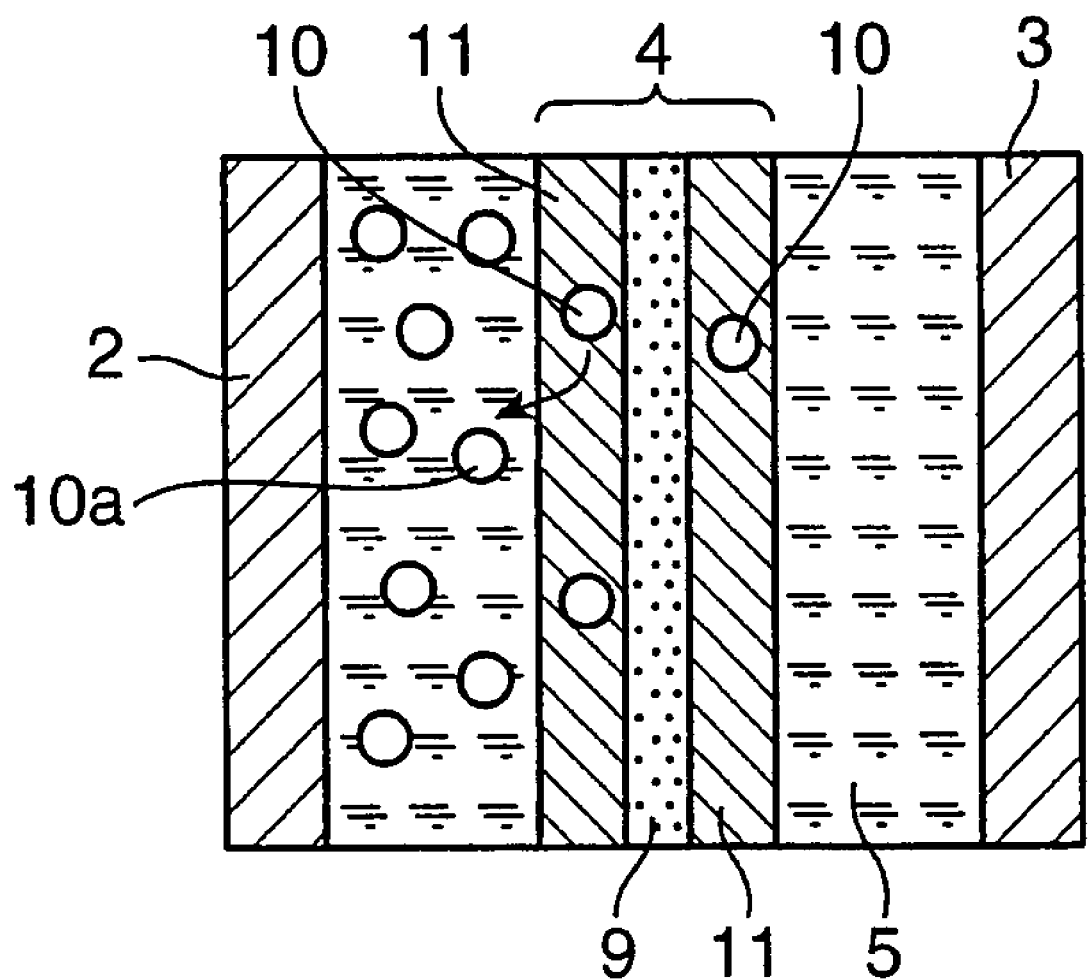
FIG. 2 is a conceptual diagram showing a structure of a capacitor element of an electrolytic capacitor according to an embodiment of the present invention.

A conceptual diagram showing a structure of said capacitor element is shown in FIG. 2.

In FIG. 2, the reference numerals 2 and 3 denote electrodes; 4 a conductive separator (E); 5 an electrolytic solution for electrolytic capacitor; 9 a separator base member (G); 10 a dopant agent (H); 10a a dopant agent coming off into the electrolytic solution for electrolytic capacitor; and 11 a conductive polymer layer (F).

The conductive separator (E) 4 includes the separator base member (G) 9, and the conductive polymer layer (F) 11 containing a dopant agent (H) 10 and each formed on both surfaces of the separator base member (G) 9. The conductive separator (E) 4 has a resistance lower than that of the separator base member (G) 9, because the conductive separator (E) 4 is formed with the conductive polymer layer (F) 11 on surfaces and holes of the separator base member, and accordingly, becomes conductive.

A specific example of the conductive separator (E) 4 includes a conductive separator obtained by forming, for example, the conductive polymer layer (F) 11 composed of polypyrrole containing the dopant agent (H) 10 such as 1-naphthalenesulfonic acid and the like onto both surfaces of the separator base member (G) 9 such as mixed-wet unwoven cloth and the like.

FIG. 2 shows the conductive separator (E) 4 as having a structure in which the separator base member (G) 9 is interposed between the conductive polymer layers (F) 11. However, this structure is only schematic in convenience of description. Specifically, for example, if the separator base member (G) 9 is made of mixed-wet unwoven cloth, the conductive polymer layer (F) 11 is formed on the fiber surfaces of the mixed-wet unwoven cloth.

An example of said mixed-wet unwoven cloth include, for example, mixed-wet unwoven cloth formed of polyethylene telephthalate-based polyester fiber containing 3,5-dicarbomethoxybenzene sulfonic acid as a copolymer component, and fiber containing, as a main component, polyethylene telephthalate-based polyester fiber containing diethylene glycol as a copolymer component.

The conductive polymer layer (F) 11 containing 1-naphthalenesulfonic acid as the dopant agent (H) 10 is formed onto the surface of said mixed-wet unwoven cloth in the following manner: an oxidant obtained by mixing ammonium persulfate, 2-naphthalenesulfonic acid, water, and alcohol is attached onto the surface of the mixed-wet unwoven cloth, and then a monomer solution of pyrrole is vapor-phase polymerized with the oxidant.

As said separator base member (G) 9, besides the unwoven cloth such as the mixed-wet unwoven cloth described above, manila paper, kraft paper, cloth, or a sheet-like insulator such as polymer film may be used.

On the other hand, as a conductive polymer for constituting the conductive polymer layer (F) 11, a conductive polymer having a conjugated double bond (hereinafter, also referred to as a conjugated double bond polymer) obtained by polymerizing one or two or more monomers is used.

Examples of the monomers include, for example, compounds (1) to (4) described below having 2 to 30 or more carbon atoms:

(1) Aliphatic triple bond compounds: acetylene, 1,6-heptadiyne, and the like;

(2) Aromatic conjugated compounds: benzene, naphthalene, anthracene, and the like;

(3) Hetero atoms-containing conjugated compounds: heterocyclic compounds such as pyrrole, thiophene, furan, ethylene dioxythiophene, and the like; and non-heterocyclic compounds such as aniline, sulfonated aniline, diphenyl sulfide, and the like;

(4) Compounds in which the hydrogen atoms of the (1) to (3) compounds are substituted by alkyl groups having 1 to 20 carbon atoms (for example, methyl, ethyl, lauryl, stearyl groups, and the like), aryl groups having 6 to 26 carbon atoms (phenyl, naphthyl groups, and the like).

These monomers may be used alone or in combination of two or more of them. Among them, (3) the hetero atoms-containing conjugated compounds are preferable, and more preferable are heterocyclic compounds and aniline, and especially preferable are pyrrole, thiophene, ethylene dioxythiophene and aniline.

Preferable examples of the conductive polymer constituting the conductive polymer layer (F) 11 include, for example, at least one selected from the group consisting of polypyrrole, polythiophene, polyethylenedioxythiophene, and polyaniline.

Then, normally, the conjugated double bond polymer contains the dopant agent (H) 10 for achieving p-type or n-type doping.

The doping (or also referred to as to dope) means that the conjugated double bond polymer is allowed to contain an electron-accepting or electron-donating compound (the dopant agent (H) 10) for giving conductivity so as to promote the transfer of the charges between the conjugated double bond polymer and the separator base member (G) 9 and, as a result, to increase the conductivity of the conjugated double bond polymer.

For example, the conjugated double bond polymer is p-type doped with the electron-accepting dopant agent. In this manner, a part of electrons existing on the bonding orbital π in the conjugated system is removed to generate carriers, thereby increasing the conductivity of the conjugated double bond polymer.

It is especially preferable that the conductive polymer layer (F) 11 of the present invention is formed of the conductive polymer obtained by p-type doping the conjugated double bond polymer with the dopant agent (H) 10.

The conductive separator (E) 4 can be produced in the following manner: a liquid in which the conductive polymer for constituting the conductive polymer layer (F) 11 is dissolved or dispersed is applied onto the separator base member (G) 9 or the separator base member (G) 9 is impregnated with the liquid; then, the medium of said liquid is volatized.

Alternatively, the conductive separator (E) 4 may be produced by in-situ polymerization using polymerizable monomers in the presence of the separator base member (G) 9 so as to form the conductive polymer on the surface of the separator base member (G) 9.

As means of said in-situ polymerization, chemical means of polymerization using a oxidant is preferable. As a method, one of the following methods may be employed: a method in which a treatment liquid containing an oxidant and a dopant agent together with a polymerizable monomer is applied onto or impregnated into the separator base member (G) 9, thereby forming the conductive polymer layer (F) 11; and a method in which the monomer solution and the solution of the oxidant containing the dopant agent are separately prepared, and the respective solutions are sequentially applied onto or impregnated into the separator base member (G) 9, thereby forming the conductive polymer layer (F) 11.

Alternatively, an oxidant and a dopant agent are adhered to the separator base member (G) 9 beforehand. Then, a monomer solution is applied onto or impregnated into the resultant separator base member (G) 9, thereby forming the conductive polymer layer (F) 11.

Still alternatively, an oxidant and a dopant agent are adhered to the separator base member (G) 9 beforehand, and the vapor of a monomer is brought into contact with the resultant separator base member (G) 9 to induce polymerization, so as to form the conductive polymer layer (F).

The method for p-type doping the conjugated double bond polymer with the dopant agent (H) 10 is not specifically limited. For example, a method in which the separator base member formed with the conjugated double bond polymer on its surface is immersed into the liquid solution of the dopant agent (H) 10 may be employed.

In the present invention, examples of the dopant agent (H) 10 for use in the p-type doping include organic sulfonic acid, fluorocarboxylic acid, boron complex, halogenated inorganic acid, and the like, which are electron-accepting compounds.

Specific examples of said organic sulfonic acid include the following compounds:

(1) saturated or unsaturated aliphatic sulfonic acid: [monovalent saturated aliphatic sulfonic acid (methane sulfonic acid, ethane sulfonic acid, propane sulfonic acid, isopropyl sulfonic acid, butane sulfonic acid, isobutyl sulfonic acid, t-tubyl sulfonic acid, pentane sulfonic acid, isopentyl sulfonic acid, hexane sulfonic acid, nonane sulfonic acid, decanoic sulfonic acid, undecanoic sulfonic acid, dodecanoic sulfonic acid, tridecanoic sulfonic acid, tetradecanoic sulfonic acid, n-octyl sulfonic acid, cetyl sulfonic acid, and the like), monovalent unsaturated aliphatic sulfonic acid (ethylene sulfonic acid, 1-propene- 1-sulfonic acid, and the like), bivalent or more aliphatic sulfonic acid (methionic acid, 1,1-ethane disulfonic acid, 1,2-ethane disulfonic acid, 1,1-propane disulfonic acid, 1,3-propane disulfonic acid, polyvinyl sulfonic acid, and the like), oxy aliphatic sulfonic acid (isethionic acid, 3-oxy-propane sulfonic acid, and the like), sulfo aliphatic carboxylic acid (sulfoacetic acid, sulfosuccinic acid), sulfo aliphatic carboxylate (di(2- ethylhexyl) sulfosuccinic acid, and the like)].

(2) Fluorosulfonic acid $RfSO_3H$, (where Rf is a fluoroalkyl group having 1 to 30 carbon atoms)(trifluoromethane sulfonic acid, perfluoroethane sulfonic acid, perfluoropropane sulfonic acid, perfluoroisopropyl sulfonic acid, perfluoro butane sulfonic acid, perfluoro isobutyl sulfonic acid, perfluoro t-butyl sulfonic acid, perfluoro pentane sulfonic acid, perfluoro isopentyl sulfonic acid, perfluoro hexane sulfonic acid, perfluoro nonane sulfonic acid, perfluorodecanoic sulfonic acid, perfluoro undecanoic sulfonic acid, perfluoro dodecanoic sulfonic acid, perfluoro tridecanoic sulfonic acid, perfluoro tetradecanoic sulfonic acid, perfluoro n-octyl sulfonic acid, perfluoro cetyl sulfonic acid, and the like).

(3) Aromatic sulfonic acid having 6 to 30 or more of carbon atoms: [monovalent aromatic sulfonic acid (benzene sulfonic acid, p-toluenesulfonic acid, o-toluenesulfonic acid, m-toluene sulfonic acid, o-xylene-4-sulfonic acid, m-xylene-4-sulfonic acid, 4-ethybenzene sulfonic acid, 4-propylbenzene sulfonic acid, 4-butylbenzene sulfonic acid, 4-dodecylbenzene sulfonic acid, 4-octylbenzene sulfonic acid, 2-methyl-5-isopropylbenzene sulfonic acid, 2-naphthalene sulfonic acid, butyl naphthalene sulfonic acid, t-butyl naphthalene sulfonic acid, 2,4,5-trichlorobenzene sulfonic acid, benzylsulfonic acid, phenylethane sulfonic acid, and the like), bivalent or more aromatic sulfonic acid (m-benzene disulfonic acid, 1,4-naphthalene disulfonic acid, 1,5-naphthalene disulfonic acid, 1,6-naphthalene disulfonic acid, 2,6-naphthalene disulfonic acid, 2,7-naphthalene disulfonic acid, 1,3,6-naphthalene trisulfonic acid, sulfonated polystyrene, and the like)], oxy aromatic sulfonic acid (phenol-2-sulfonic acid, phenol-3-sulfonic acid, phenol-4-sulfonic acid, anisole-o-sulfonic acid, anisole-m-sulfonic acid, phenetol-o-sulfonic acid, phenetol-m-sulfonic acid, phenol-2,4-disulfonic acid, phenol-2,4-6-trisulfonic acid, anisole-2,4-disulfonic acid, phenetol-2,5-disulfonic acid, 2-oxytoluene-4-sulfonic acid, pyrocatechine-4-sulfonic acid, veratrole-4-sulfonic acid, resorcin-4-sulfonic acid, 2-oxy- 1-methoxybenzene-4-sulfonic acid, 1,2-dioxybenzene-3,5-disulfonic acid, resorcin-4, 6-disulfonic acid, hydroquinone sulfonic acid, hydroquinone-2,5-disulfonic acid, 1,2,3-trioxybenzene-4-sulfonic acid, and the like), sulfo aromatic carboxylic acid (o-sulfobenzoic acid, m-sulfobenzoic acid, p-sulfobenzoic acid, 2,4-disulfo benzoic acid, 3-sulfophthalic acid, 3,5-disulfophthalic acid, 4-sulfoisophthalic acid, 2-sulfotelephthalic acid, 2-methyl-4-sulfobenzoic acid, 2-methyl-3,5-disulfobenzoic acid, 4-propyl-3-sulfobenzoic acid, 2,4,6-trimethyl -3-sulfobenzoic acid, 2-methyl-5-sulfotelephthalic acid, 5-sulfosalicylic acid, 3-oxy-4-sulfobenzoic acid, and the like), thio aromatic sulfonic acid (thiophenol sulfonic acid, thioanisole-4-sulfonic acid, thiophenetole-4-sulfonic acid, and the like), and other aromatic sulfonic acid having functional groups (benzaldehyde-o-sulfonic acid, benzaldehyde-2,4-disulfonic acid, acetophenone-o-sulfonic acid, acetophenone-2,4-disulfonic acid, benzophenone-o-sulfonic acid, benzophenone-3-3'-disulfonic acid, 4-aminophenol-3-sulfonic acid, anthraquinone-1-sulfonic acid, anthraquinone- 1,5-disulfonic acid, anthraquinone-1,8-disulfonic acid, anthraquinone-2,6-disulfonic acid, 2-methylanthraquinone -1-sulfonic acid, and the like)].

Specific examples of fluorocarboxylic acid include the following compounds, for example.

Fluorocarboxylic acid RfCOOH (where Rf means fluoroalkyl group having 1 to 30 carbon atoms): (trifluoroacetic acid, perfluoropropionic acid, perfluoroisopropionic acid, perfluoro butyric acid, perfluoro valeric acid, perfluoro caproic acid, perfluoro pelargonic acid, perfluoro capric acid, perfluoro undecylic acid, perfluoro tridecanoic acid, perfluoro tetradecanoic acid, perfluoro n-octane acid, perfluoro lauric acid, perfluoro palmitic acid, and the like).

Specific examples of boron complex include the following compounds, for example:

(1) Boric acid compound complex containing alcoholic hydroxyl group: ethylene glycol borate complex, trimethylene glycol borate complex, and the like;

(2) Boric acid compound ester complex containing carboxyl group: borodioxalic acid ester complex, borodiglycol acid ester complex;

(3) Boric acid phosphoric acid and/or phosphoric ester complex: methyl borate phosphate complex, ethyl borate phosphate complex, and the like; the details of boric acid complex described in the Japanese Patent No. 2966451 can be employed.

Specific examples of halogenated inorganic acid include the following compounds:

HF, $HPF_6$, $HBF_4$, $HAsF_6$, $HSbF_6$, $HAlF_4$, $HTaF_6$, $HNbF_6$, $H_2SiF_6$, HCl, $HPCl_6$, $HBCl_4$, $HAsCl_6$, $HSbCl_6$, $HAlCl_4$, $HTaCl_6$, $HNbCl_6$, $H_2SiCl_6$, HBr, $HPBr_6$, $HBBr_4$, $HAsBr_6$, $HSbBr_6$, $HAlBr_4$, $HTaBr_6$, $HNbBr_6$, $H_2SiBr_6$, $HClO_4$, and the like.

These may be used alone or in combination of two or more of them.

Among them, preferable are methanesulfonic acid, t-butyl sulfonic acid, pentane sulfonic acid, dodecyl benzene sulfonic acid, benzene sulfonic acid, p-toluene sulfonic acid, 4-ethylbenzene sulfonic acid, 4-butylbenzene sulfonic acid, 4-octylbenzene sulfonic acid, 2-naphthalene sulfonic acid, butyl naphthalene sulfonic acid, anthraquinone-2-sulfonic acid, di(2-ethylhexyl) sulfosuccinic acid, o-sulfobenzoic acid, perfluorobutanesulfonic acid, perfluoropentanesulfonic acid, trifluoro acetic acid, perfluoro butyric acid, borodioxalic acid ester complex, borodiglycol acid ester complex, $HBF_4$, $HAlF_4$, $HBCl_4$, and $HBBr_4$. More preferable are t-butyl sulfonic acid, pentanesulfonic acid, p-toluene sulfonic acid, 4-butylbenzene sulfonic acid, 2-naphthalene sulfonic acid, butylnaphthalene sulfonic acid, anthraquinone-2-sulfonic acid, perfluorobutane sulfonic acid, and perfluoropentane sulfonic acid.

Next, the components of the first electrolytic solution for electrolytic capacitor of the present invention will be described in detail.

The aforementioned electrolytic solution for electrolytic capacitor is prepared by dissolving an acid component (D) and a base component (C) as electrolytic components into a solvent such as an organic solvent and the like at such a molar ratio that the acid component (D) is excessive.

In the case where a conventional electrolytic solution is used for the electrolytic capacitor which uses the conductive separator (E) 4 formed with the conductive polymer layer (F) 11 containing the dopant agent (H) 10 as a separator, there arises a dedoping phenomenon where the dopant agent comes out of the conductive polymer layer (F) 11 into the electrolytic solution. Then, the dopant agent which has turned into an anion in the electrolytic solution makes the electrolytic solution acidic.

However, when the aforementioned electrolytic solution for electrolytic capacitor is used, the dedoping phenomenon above can be suppressed. Specifically, the molar ratio between the acid component (D) and the base component (C) in the electrolytic component is adjusted beforehand in such a manner that the acid component (D) is excessive. In this manner, pH value of the electrolytic solution is lowered. As a result, the pH of the anionized dopant agent and the pH of the electrolytic solution become close to each other, thereby suppressing the dedoping phenomenon. Thus, an increase in the ESR due to the dedoping phenomenon in the conductive polymer layer (F) can be suppressed, thereby elongating the lifetime of the electrolytic capacitor.

As the method for adjusting the acid component (D) to be excessive at the molar ratio between the acid component (D) and the basic component (C) as the electrolytic component, employable are a method in which a generally-used electrolytic solution is added with another acid component in a later step; and a method in which the acid component is adjusted to be excessive beforehand in the step of producing the electrolytic solution, and the like.

The preferable molar ratio of the acid component (D) to the base component (C) at which the acid component (D) is excessive in the electrolytic solution is 1:1.05 to 1:1.5 (the basic component (C): the acid component (D)). If the acid component (D) is at too low ratio in the aforementioned ratio, there is a tendency that the anionized dopant agent forms an ion pair with the base component, thereby enhancing the dedoping phenomenon from the conductive polymer. Contrarily, if the acid component (D) is at too high ratio, there is a tendency that the conductivity of the electrolytic solution is decreased, thereby deteriorating the ESR characteristic.

The pH of the electrolytic solution for electrolytic capacitor is preferably 2 to 7, and more preferably 4 to 7, and especially preferably 5 to 7. If the pH is less than 2, a corrosion due to a dissolution of an electrode material proceeds remarkably, thereby making difficult to secure reliability. If the pH exceeds 7, an excessive base component forms an ion pair, thereby improve a reaction to take off the dopant.

When organic sulfonic acid and the like is used as the acid component in the electrolytic component, it is the same component as the dopant agent (H) to be contained in the conductive polymer layer (F) and thus the dedoping is hard to occur. As a result, the deterioration in reliability of the electrolytic capacitor can be suppressed. However, since said organic sulfonic acid exhibits strong acidity, there is a fear that the sulfonic acid may corrode the electrodes depending on its added amount. Therefore, it is preferable to use organic carboxylic acid (D1) such as aromatic carboxylic acid, aliphatic carboxylic acid, and the like, instead of the sulfonic acid. When organic carboxylic acid (D1) such as aromatic carboxylic acid, aliphatic carboxylic acid, and the like is used as the acid component (D), the aforementioned corrosion can be suppressed.

Examples of the organic carboxylic acid (D1) include aromatic carboxylic acid: (for example, phthalic acid, salicylic acid, isophthalic acid, telephthalic acid, trimellitic acid, pyromellitic acid, benzoic acid, resorcin acid, cinnamic acid, naphtoic acid), aliphatic carboxylic acid ([saturated carboxylic acid, for example, oxalic acid, malonic acid, succinic acid, glutaric acid, adipic acid, pimelic acid, suberic acid, azelaic acid, sebacic acid, undecanedioic acid, dodecanedioic acid, tridecanedioic acid, tetracanedioic acid pentadecanedioic acid, hexadecanedioic acid, methylmalonic acid, ethylmalonic acid, propylmalonic acid, butylmalonic acid, pentylmalonic acid, hexylmalonic acid, dimethylmalonic acid, diethylmalonic acid, methylpropylmalonic acid, methylbutyl malonic acid, ethylpropyl malonic acid, dipropylmalonic acid, methylsuccinic acid, ethyl succinic acid, 2,2-dimethylsuccinic acid, 2,3-dimethylsuccinic acid, 2-methylglutaric acid, 3-methylglutaric acid, 3-methyl-3-ethyl glutaric acid, 3,3-diethylglutaric acid, methyl succinic acid, 2-methylglutaric acid, 3-methylglutaric acid, 3,3-dimethylglutaric acid, 3-methyladipic acid, 1,6-decanedicarboxylic acid, 5,6-decanedicarboxylic acid, formic acid, acetic acid, propionic acid, butyric acid, isobutyric acid, valeric acid, caproic acid, enanthic acid, capric acid, pelargonic acid, lauric acid, myristic acid, stearic acid, behenic acid, undecanoic acid], [unsaturated carboxylic acid, for example, maleic acid, fumaric acid, itaconic acid, acrylic acid, methacrylic acid, oleic acid]), and the like. These may be used alone or in combination of two or more them. Among them, phthalic acid, trimellitic acid, pyromellitic acid, maleic acid, salicylic acid, bezoic acid, resorcin acid, and the like are preferably used, because they have high conductivity and are thermally stable.

On the other hand, examples of the basic component (C) of said electrolytic compound include, for example, compounds having alkyl-substituted amidine groups such as imidazole compound, benzoimidazole compound, alicyclic amidine compound (pyrimidine compound, imidazoline compound), and the like, and quaternary salt compounds of said compounds having alkyl-substituted amidine groups, and specifically, for example, imidazolium compound, benzoimidazolium compound, alicyclic amidinium compound (pyrimidinium compound, imidazolinium compound), and the like which are quarternized by alkyl group or aryl alkyl group having 1 to 11 carbon atoms.

Examples of said compounds having alkyl-substituted amidine groups include, for example, imidazole compounds such as 1-methyl imidazole, 1,2-dimethylimidazole, 1-ethyl-2-methyl imidazole; benzoimidazole compounds such as 1-methylbenzoimidazole, 1,2-dimethylbenzoimidazole, 1-ethyl-2-methylbenzoimidazole, and the like; pyrimidine compounds such as 1-methyl pyrimidine, 1-ethylpyrimidine, and the like; imidazoline compounds such as 1-methyl imidazoline, 1,2-dimethyl imidazoline, 1,2,4-trimethylimidazoline, and the like.

Further, examples of the quaternary salt compounds having alkyl-substituted amidine groups include, for example, imidazolium compounds such as 1,3-dimethylimidazolium, 1,3-diethylimidazolium, 1-ethyl-3-methylimidazolium, 1,2,3-trimethylimidazolium, 1,2,3,4-tetramethylimidazolium, 1,3-dimethyl-2-ethylimidazolium, 1,2-dimethyl-3-ethylimidazolium, 1,2,3-triethylimidazolium, 1,2,3,4-tetraethylimidazolium, 1,3-dimethyl-2-phenylimidazolium, 1,3-dimethyl-2-benzylimidazolium, 1-benzyl-2,3-dimethylimidazolium, 4-cyano-1,2,3-trimethylimidazolium, 3-cyanomethyl-1,2-dimethylimidazolium, 2-cyanomethyl-1,3-dimethylimidazolium, 4-acetyl-1,2,3-trimethylimidazolium, 3-acetylmethyl-1,2-dimethylimidazolium, 4-methylcarboxymethyl-1,2,3-trimethylimidazolium, 3-methylcarboxymethyl-1,2-dimethylimidazolium, 4-methoxy-1,2,3-trimethylimidazolium, 3-methoxymethyl-1,2-dimethylimidazolium, 4-formyl-1,2,3-trimethylimidazolium, 3-formylmethyl-1,2-dimethylimidazolium, 3-hydroxyethyl-1,2-dimethylimidazolium, 4-hydroxymethyl-1,2,3-trimethylimidazolium, 2-hydroxyethyl-1,3-dimethylimidazolium, and the like; benzoimidazolium compounds such as 1,3- dimethylbenzoimidazolium, 1,2,3-trimethylbenzoimidazolium, 1-ethyl-2,3-dimethylbenzoimidazolium, and the like; pyrimidinium compounds such as 1,3-dimethyl-1,4,5,6-tetrahydropyrimidinium, 1,2,3-trimethyl-1,4,5,6-tetrahydropyrimidinium, 1,2,3,4-tetramethyl-1,4,5,6-tetrahydropyrimidinium, 1,2,3,5-tetramethyl-1,4,5,6-tetrahydropyrimidinium, 8-methyl-1,8-diazabicyclo [5,4,0] -7-undecenium, 5-methyl-1,5-diazabicyclo [4,3,0] -5-nonenium, 4-cyano-1,2,3-trimethyl-1,4,5,6-tetrahydropyrimidinium, 3-cyanomethyl-1,2-dimethyl-1,4,5,6-tetrahydropyrimidinium, 2-cyanomethyl-1,3-dimethyl-1,4,5,6-tetrahydropyrimidinium, 4-acetyl-1,2,3-trimethyl-1,4,5,6-tetrahydropyrimidinium, 3-acetylmethyl-1,2-dimethyl-1,4,5,6-tetrahydropyrimidinium, 4-methylcarboxymethyl-1,2,3-trimethyl-1,4,5,6-tetrahydropyrimidinium, 3-methylcarboxymethyl-1,2-dimethyl-1,4,5,6-tetrahydropyrimidinium, 4-methoxy-1,2,3-trimethyl-1,4,5,6-tetrahydropyrimidinium, 3-methoxymethyl-1,2-dimethyl-1,4,5,6-tetrahydropyrimidinium, 4-formyl-1,2,3-trimethyl-1,4,5,6-tetrahydropyrimidinium, 3-formylmethyl-1,2-dimethyl-1,4,5,6-tetrahydropyrimidinium, 3-hydroxyethyl-1,2-dimethyl-1,4,5,6-tetrahydropyrimidinium, 4-hydroxymethyl-1,2,3-trimethyl-1,4,5,6-tetrahydropyrimidinium, 2-hydroxyethyl-1,3-dimethyl-1,4,5,6-tetrahydropyrimidinium, and the like; imidazolinium compounds such as 1,2,3,4-tetramethylimidazolinium, 1,3,4-trimethyl-2-ethylimidazolinium, 1,3-dimethyl-2,4-diethylimidazolinium, 1,2-dimethyl-3,4-diethylimidazolinium, 1-methyl-2,3,4-triethylimidazolinium, 1,2,3,4-tetraethylimidazolinium, 1,2,3-trimethylimidazolinium, 1,3-dimethyl-2-ethylimidazolinium, 1-ethyl-2,3-dimethylimidazolinium, 1,2,3-triethylimidazolinium, 4-cyano-1,2,3-trimethylimidazolinium, 3-cyanomethyl-1,2-dimethylimidazolinium, 2-cyanomethyl-1,3-dimethylimidazolinium, 4-acetyl-1,2,3-trimethylimidazolinium, 3-acetylmethyl-1,2-dimethylimidazolinium, 4-methylcarboxymethyl-1,2,3-trimethylimidazolinium, 3-methylcarboxymethyl-1,2-dimethylimidazolinium, 4-methoxy-1,2,3-trimethylimidazolinium, 3-methoxymethyl-1,2-dimethylimidazolinium, 4-formyl-1,2,3-trimethylimidazolinium, 3-formylmethyl-1,2-dimethylimidazolinium, 3-hydroxyethyl-1,2-dimethylimidazolinium, 4-hydroxymethyl-1,2,3-trimethylimidazolinium, 2-hydroxyethyl-1,3-dimethylimidazolinium, and the like.

These may be used alone or in combination of two or more of them.

Among them, the compounds (C1) having alkyl-substituted amidine groups are preferable, and especially preferable are imidazolium and imidazolinium compounds such as 1-ethyl-3-methylimidazolium, 1-ethyl-2,3-dimethylimidazolium, 1,2,3,4-tetramethylimidazolinium, 1,2,3-trimethylimidazolinium, 1-ethyl-2,3-dimethylimidazolinium, and the like, because they have high conductivity resulting in decrease of resistance due to the electrolytic solution and thus improvement of the ESR characteristic.

The aforementioned electrolytic solution for electrolytic capacitor may further contain an antioxidant.

Examples of said antioxidant include, aromatic compounds, amine compounds, silane compounds, quinone compounds, carboxylic acid compounds, and the like.

When aromatic compounds such as phenol, methylphenol, ethylphenol, pyrogallol, hydroquinone, pyrocatechol, tocophenol, butylhydroxyanisole,dibutylhydroxytoluene, benzoic acid, salicylic acid, resorcylic acid, benzotriazole, and the like are used as said antioxidant, the electrons contributing to the deterioration by oxidation are easily resonance stabilized. As a result, higher effect to prevent an oxidation can be achieved. Thus, the use of these aromatic compounds is especially preferable, because the decrease in the electric conductivity of the conductive separator (E) 4 due to oxidation can be suppressed.

By adding said antioxidant, the deterioration of the conductive polymer layer (F) 11 by oxidation can be suppressed, and the increase in the ESR with the elapse of time in the electrolytic capacitor (E) can be further suppressed. In addition, the effect resulted from the excessive amount of acid component in the electrolytic solution can be further increased.

The aforementioned electrolytic solution for electrolytic capacitor may contain other kinds of additives.

Examples of said additives include phosphorus-based compounds such as phosphoric ester; boric acid; boric acid-based compounds such as complex compounds of boric acid and polysaccharides such as mannitol, sorbitol, and the like, and complex compounds of boric acid and polyalcohol such as ethylene glycol, glycerin, and the like; nitro compounds such as o-nitrobenzoic acid, m-nitrobenzoic acid, p-nitrobenzoic acid, o-nitrophenol, m-nitrophenol, p-nitrophenol, and the like.

There are some cases where said additives are preferable, because they increase the spark voltage of the electrolytic solution of the present invention.

Further, examples of organic solvent into which the acid component (D), base component (C), said antioxidant and said additives and the like are to be dissolved include:

For example, alcohols [methanol, ethanol, propanol, butanol, cyclobutanol, cyclohexanol, ethylene glycol, propylene glycol, glycerin, methyl cellosolve, ethyl cellosolve, methoxypropylene glycol], ether-based solvents as non-proton organic solvents [ethylene glycol monomethyl ether, ethyleneglycol monoethyl ether, diethyleneglycol monomethyl ether, diethylene glycol monoethyl ether, ethylene glycol monophenyl ether, tetrahydrofuran, 3-methyltetrahydrofuran, ethylene glycol dimethyl ether, ethylene glycol diethyl ether, diethylene glycol dimethyl ether, diethylene glycol diethyl ether], amido-based solvents [N-methyl formamide, N,N-dimethylformamide, N-ethylformamide, N,N-diethylformamide, N-methylacetoamide, N,N-dimethylacetoamide, and the like], nitriles [acetonitrile, propionitrile, butyronitrile, acrylonitrile, methacrylonitrile, benzonitrile], lactones [γ-butyrolactone, β-butyrolactone, α-valerolactone, γ-valerolactone, and the like], carbonates [ethylene carbonate, propion carbonate, butylene carbonate, dimethyl carbonate, diethyl carbonate], sulfoxides [sulfolane, 3-methl sulfolane, dimethyl sulfoxide], and the like. These may be used alone or in combination of two or more of them.

Next, a second electrolytic solution for electrolytic capacitor and an electrolytic capacitor using the same will be described.

The second electrolytic solution for electrolytic capacitor includes a capacitor element and a casing containing said capacitor element, said capacitor element including a pair of electrodes composed of an anode chemical foil and a cathode foil, and a p-type doping conductive separator (E') which is formed with a p-type doping conductive polymer layer (F') containing a p-type dopant agent (H') on its surface and is interposed between said pair of electrodes, said p-type doping conductive separator (E') and said pair of electrodes being rolled up in an overlapped state with each other, and spaces between said pair of electrodes being impregnated with the electrolytic solution for electrolytic capacitor, wherein said electrolytic solution for electrolytic capacitor contains a component (A0) having reduction potential of −1.6 to 0V when measured in the following measuring method:

a method for measuring the reduction potential: into γ-butyrolactone into which tetraethylammonium fluoroborate is dissolved at 0.23 mol/L as a supporting electrolyte, a component (A0) is dissolved at 0.1 mol/L, and the potential thereof is measured at the time when the current at −0.2 μA flowed by means of the convective cyclic voltammetry measuring method using a Grassi carbon electrode (φ1.0 mm) as an active electrode, a (Ag/Ag$^+$) electrode as a reference electrode, and a platinum electrode as a counter electrode.

Further, the electrolytic capacitor includes a capacitor element and a casing, said capacitor element including a pair of electrodes composed of an anode chemical foil and a cathode foil, and a p-type doping conductive separator (E') which is formed with a p-type doping conductive polymer layer (F') containing a p-type dopant agent (H') on its surface and is interposed between said pair of electrodes, said p-type doping conductive separator (E') and said pair of electrodes being rolled up in an overlapped state with each other, and spaces between said pair of electrodes being impregnated with the electrolytic solution for electrolytic capacitor, wherein the aforementioned electrolytic solution for electrolytic capacitor is used as the electrolytic solution for electrolytic capacitor.

The aforementioned p-type doping conductive separator (E'), the p-type doping conductive polymer layer (F'), the separator base member (G), and the dopant agent (H) are respectively selected from those substantially identical to the conductive separator (E), the conductive polymer layer (E), the separator base member (G), the dopant agent (H) of the first invention.

Further, said anode chemical foil means an electrode including an oxidized film formed on the surface of an etched aluminum foil, whereas said cathode foil means an electrode of an etched aluminum foil.

By forming the second electrolytic capacitor using the second electrolytic solution, the reductive deterioration of the p-type doping conductive polymer layer (F') in the vicinity the cathode can be suppressed, thereby suppressing the increase in the ESR of the electrolytic capacitor in the aging step which is included in the process of manufacturing the electrolytic capacitor.

In the p-type doping conductive polymer layer (F'), a part of electrons existing on the bonding orbital π in the conjugated system is removed by the acceptor dopant to generate cationic carriers in the p-type doping conductive polymer layer (F'), so that the electric conductivity is expressed.

The reason why the electric conductivity in the p-type doping conductive polymer layer (F') decreases in said aging step is conceived as follows. That is, electrons flow from the cathode electrode into the p-type doping conductive polymer layer (F'), and the conductive polymer in the p-type doping conductive polymer layer (F') induce reduction reaction. As a result, the cationic carries in the conductive polymer disappear and consequently, the dedoping leads to a decrease in the electric conductivity.

The aforementioned electrolytic solution for electrolytic capacitor contains the component having reduction potential of −1.6 to 0V (A0). Due to this arrangement, the component (A0) serves as a sacrificial agent for inducing the reduction reaction preferentially to the conductive polymer constituting the p-type doping conductive polymer layer (F'). As a result, the reduction reaction of the conductive polymer can be suppressed.

Said reduction potential is measured by the convective cyclic voltammetry measurement (hereinafter, referred to as a CV measurement) in a state where the liquid solution stirred with a stirrer. In the CV measurement, a three-electrode type cell including an active electrode, a counter electrode, and a reference electrode, where a Grassi carbon electrode (φ 1.0 mm) is used as an active electrode, a platinum electrode as a counter electrode, and a non-aqueous medium-based (Ag/Ag$^+$) reference electrode as a reference electrode.

The liquid solution to be measured is prepared as follows: into γ-butyrolactone into which tetraethylammonium fluoroborate is dissolved at 0.23 mol/L as a supporting electrolyte, the component (A0) was dissolved at 0.1 mol/L.

The CV measurement is conducted as follows: The potential at which the potential scanning is to be started (hereinafter, also referred to as initial potential) is set to 0V, and the potential scanning is started from the initial potential toward the positive side. The potential at the positive turning point is set to 3V, the potential at the negative turning point is set to −3V, and the end potential is set to 0V. The potential is scanned at the velocity of 5 mV/s.

The potential is scanned from the positive turning point toward the negative potential side, and the potential obtained when the current is −0.2 μA is determined as reduction potential.

The reduction potential of the component (A0) is −1.6 to 0V, and preferably −1.5 to −0.1V, and more preferably −1.4 to −0.2V, and especially preferably −1.3 to −0.3V. If the reduction potential of the component (A0) is less than −1.6V, the component (A0) does not serve as a sacrificial agent for inducing the reduction reaction preferentially to the conductive polymer in the vicinity of the cathode electrode. In this case, the reduction reaction of the conductive polymer (F') cannot be suppressed and the electric conductivity of the conductive polymer layer (F') is decreased. On the other hand, if the reduction potential of the component (A0) exceeds 0V, the electrolytic solution components cause an oxidative deterioration of the conductive polymer. In this case, the electric conductivity of the conductive polymer layer (F') is decreased.

The content of the component (A0) is preferably at 0.05 to 10 mol/L in the total amount of the electrolytic solution, and more preferably 0.07 to 5 mol/L, and especially preferably 0.1 to 3 mol/L, and more especially preferably 0.2 to 2 mol/L.

The content of the component (A0) is preferably at 0.05 mol/L or higher from the viewpoint of the efficiency as the sacrificial agent to suppress the reductive deterioration of the conductive polymer, and is preferably at 10 mol/L or lower from the view point of suppressing the decrease in the electric conductivity.

Specific examples of the compound (A0) include, for example, chromic acid compounds, manganese acid compounds, organic peroxides, inorganic peroxides, nitro compounds, trivalent or more polycarboxylic acid compounds, primary to tertiary ammonium compounds, sulfoxide compounds, halogen compounds, benzoquinone compounds, and the like.

(1) Specific examples of the chromic acid compounds include the following compounds, for example:

chromic acid, chromic anhydride, potassium bichromate, sodium chromate, methyl chromate ester, ethyl chromate ester, propyl chromate ester, isopropyl chromate ester, butyl chromate ester, isobutyl chromate ester, chromic-t-butyl ester, chromyl chloride, and the like.

(2) Specific examples of the manganese acid compounds include the following compounds, for example:

potassium permanganate, sodium permanganate, potassium manganate, sodium manganate, manganese bioxide, trivalent manganese potassium, trivalent manganese sodium, and the like.

(3) Specific examples of the organic peroxides include the following compounds, for example:

percarboxylic acids such as perbenzoic acid, peracetic acid, performic acid, mono perphthalic acid, mono perisophthalic acid, mono pertelephthalic acid, trifluoro peracetic acid, perpropionic acid, perbutyric acid, mono persuccinic acid, and the like; persulfonic acids such as methane persulfonic acid, ethane persulfonic acid, propane persulfonic acid, isopropane persulfonic acid, benzene persulfonic acid, p-toluene persulfonic acid, 1-naphthalene persulfonic acid, 2-naphthalene persulfonic acid, and the like.

(4) Specific examples of the inorganic peroxides include the following compounds, for example:

hydrogen peroxide, ozone, peroxy disulfuric acid, peroxy monosulfuric acid, monoperoxy phosphoric acid, diperoxy phosphoric acid, and the like.

(5) Specific examples of the nitro compounds include the following compounds, for example:

nitromethane, nitroethane, nitropropane, 2-nitropropane, 1-nitrobutane, 2-nitrobutane, nitrobenzene, p-nitrobenzoic acid, m-nitrobenzoic acid, 3,5-dinitrobenzoic acid, 3-chloro-2-nitrobenzoic acid, 3-nitrophthalic acid, 4-nitrophthalic acid, 5-nitrosalicylic acid, 3,5-dinitrosalicylic acid, o-nitrocinnamic acid, picric acid, o-nitrotoluene, p-nitrotoluene, o-nitrophenol, p-nitrophenol, p-nitrophenyl acetate, p-nitrophenyl acetic acid, 3-bromo-7-nitroindazole, 2-bromo-2-nitro-1,3-propanediol, n-butyl-n-butanolnitrosoamine, 1-chloro-2,4-dinitrobenzene, N-chloromethyl-4-nitrophthalimide, 2-chloro-4-nitroaniline, 2-chloro-3-nitropyridine, 2,3-dichloronitrobenzene, diisopropanol nitrosoamine, 2,4-dinitroanisole, m-dinitrobenzene, 2,4-dinitrophenol, 2,4-dinitrophenyl hydrazine, 2-methyl-5-nitroaniline, 4-methyl-2-nitroaniline, metronidazole, o-nitroacetophenone, p-nitroacetophenone, o-nitroaniline, p-nitroaniline, o-nitrobenzaldehyde, m-nitrobenzaldehyde, 5-nitrobenzotriazole, m-nitrobenzyl alcohol, p-nitrobenzyl alcohol, 4-(p-nitrobenzyl)pyridine, 4-nitrocatechol, nitrocellulose, and the like.

(6) Specific examples of the trivalent or more of polycarboxylic acid compounds include the following compounds, for example:

hemimellitic acid, trimellitic acid, trimesic acid, pyromellitic acid, prehnitic acid, mellophanic acid, benzenepentacarboxylic acid, mellitic acid, lead tetraacetate, and the like.

(7) Specific examples of the primary ammonium compounds include the following compounds, for example:

methyl ammonium, ethyl ammonium, propyl ammonium, isopropyl ammonium, butyl ammonium ethylene diammonium, ethylenediamine monoammonium, 1,2-diammonium propane, 1,2-diaminopropane monoammonium, and the like.

(8) Specific examples of the secondary ammonium compounds include the following compounds, for example:

dimethyl ammonium, diethyl ammonium, methyl ethyl ammonium, methyl propyl ammonium, methyl isopropyl ammonium, dipropyl ammonium, diisopropyl ammonium, methylformyl methyl ammonium, methylformyl ethyl ammonium, pyrrolidine ammonium, 2-pyrrolidone ammonium, piperidine ammonium, pipecoline ammonium, ammonium pipecolate, piperazine monoammonium, piperazine diammonium, piperidone ammonium, pyrazolidine monoammonium, pyrazolidine diammonium, 2-pyrazoline ammonium, pyrazole ammonium, pyrazolone monoammonium, pyrazolone diammonium, and the like.

(9) Specific examples of tertiary ammonium compounds include the following compounds, for example:

trimethyl ammonium, triethyl ammonium, dimethyl ethyl ammonium, dimethyl propyl ammonium, dimethyl isopropyl ammonium, diethyl methyl ammonium, methyl ethyl propyl ammonium, methyl ethyl isopropyl ammonium, dipropyl methyl ammonium, diisopropyl methyl ammonium, dimethyl formyl methyl ammonium, dimethyl formyl ethyl ammonium, diethyl formyl methyl ammonium, diethyl formyl ethyl ammonium, dimethyl methoxy carbonyl methyl ammonium, diethyl methoxy carbonyl methyl ammonium, dimethyl cyanomethyl ammonium, dimethyl cyanoethyl ammonium, diethyl cyanomethyl ammonium, diethyl cyanoethyl ammonium, dimethyl methoxymethyl ammonium, dimethyl methoxyethyl ammonium, diethyl methoxymethyl ammonium, diethyl methoxyethyl ammonium, dimethyl acetylmethyl ammonium, diethyl acetylmethyl ammonium, dimethyl hydroxymethyl ammonium, dimethyl hydroxyethyl ammonium, diethyl hydroxymethyl ammonium, diethyl hydroxyethyl ammonium, pyridine ammonium, pyridyl ammonium, 1,5-diazabicyclo(4,3,0)noneneammonium, and the like.

(10) Specific examples of the sulfoxide compounds include the following compounds, for example:

sulfolane, 2-methyl sufolane, 3-methyl sulfolane, 2,4-dimethyl sulfolane, 2,3-dimethyl sulfolane, 2-ethyl sulfolane, 3-ethyl sulfolane, 2,4-diethyl sulfolane, 2,3-diethyl sulfolane, 3-sulfolene, dimethyl sulfone, methylethyl sulfone, diethyl sulfone, methylisopropyl sulfone, methylbutyl sulfone, dipropyl sulfone, methylphenyl sulfone, dimethyl sulfoxide, methyl ethyl sulfoxide, diethyl sulfoxide, and the like.

(11) Specific examples of the halogenated compounds include the following compounds, for example:

hypochlorous acid, chloric acid, hypobromous acid, bromic acid, paraperiodic acid, sodium methaperiodate, HF, $HPF_6$, $HBF_4$, $HAsF_6$, $HSbF_6$, $HAlF_4$, $HTaF_6$, $HNbF_6$, $H_2SiF_6$, HCl, $HPCl_6$, $HBCl_4$, $HAsCl_6$, $HSbCl_6$, $HAlCl_4$, $HTaCl_6$, $HNbCl_6$, $H_2SiCl_6$, HBr, $HPBr_6$, $HBBr_4$, $HAsBr_6$, $HSbBr_6$, $HAlBr_4$, $HTaBr_6$, $HNbBr_6$, $H_2SiBr_6$, $HClO_4$, and the like.

(12) Specific examples of the benzoquinone compounds include the following compounds, for example:

o-benzoquinone, p-benzoquinone, 2-methyl benzoquinone, 2,5-dimethyl benzoquinone, 2,6-dimethylbenzoquinone, 2,3,5-trimethyl benzoquinone, 2,3,5,6-tetramethyl benzoquinone, and the like.

Said components (A0) may be used alone or in combination of two or more of them.

Among them, more preferable are organic peroxides, primary ammonium compounds, secondary ammonium compounds, tertiary ammonium compounds, trivalent or more of polycarboxylic acid compounds, nitro compounds, and benzoquinone compounds. Especially preferable are perbenzoic acid, mono perphthalic acid, dimethylethyl ammonium salt, triethyl ammonium salt, diethylmethyl ammonium salt, trimellitic acid, trimesic acid, pyromellitic acid, p-nitrobenzoic acid, 3-nitrophthalic acid, and p-benzoquinone.

Said component (A0) may be contained as an electrolyte in the electrolytic solution for electrolytic capacitor of the second invention in the state where, when said component (A0) is acid compound, it is combined with base compound to form an electrolyte salt, whereas when said component (A0) is base compound, it is combined with acid compound to form an electrolyte salt.

Specifically, for example, when the aforementioned primary ammonium compounds, secondary ammonium compounds, or tertiary ammonium compounds which are the base compounds are used as the component (A0), they may be contained as an electrolyte in combination with chromic acid, chromic anhydride of the above (1); permanganic acid, manganese acid of the above (2); organic peroxides of the above (3); inorganic peroxides of the above (4); nitro group-containing carboxylic acid of the above (5); trivalent or more of polycarboxylic acid of the above (6); halogenated inorganic acids of the above (11); and the acid compounds constituting the electrolyte (B') listed below.

Further, examples of the base compounds or acid compounds for constituting an electrolyte salt with the component (A0) includes the later-described base components (C') and acid components (D') of the electrolyte (B'). Further, both of the acid compound and the base compound for constituting the electrolyte salt may be the component (A0).

Specifically, examples include, for example, salts of an acid of nitro compound and base compound [for example, triethyl ammonium•3-nitrophthalate, 1,2,3,4-tetramethyl imidazolinium• p-nitro benzoic acid, and the like], salts of trivalent or more of polycarboxylic acid compound and base compound [for example, 1,2,3,4-tetramethyl imidazolinium•pyromelliate, diethylmethyl ammonium• pyromelliate, and the like], salts of tertialy ammonium compound with acid compound [dimethyl ethyl ammonium•phthalate, and the like].

It is preferable that the aforementioned electrolytic solution for electrolytic capacitor also includes an electrolyte (B') together with the component (A0). The electrolyte (B') is different from said component (A0).

An example of the base component for constituting the electrolyte (B') includes compounds having onium cations.

Especially, compounds (C'1) having alkyl-substituted amidine groups and/or compounds (C'2) having alkyl-substituted guanidine groups are preferable.

Examples of the compounds (C'1) having alkyl-substituted amidine groups include the followings, for example:

(1) Imidazoliniums:

Same imidazolinium compounds illustrated in the description of the first electrolytic solution for electrolytic capacitor are exemplified.

(2) Imidazoliums:

Same imidazolium compounds illustrated in the description of the first electrolytic solution for electrolytic capacitor are exemplified.

(3) Tetrahydropyrimidiniums

Same pyrimidinium compounds illustrated in the description of the first electrolytic solution for electrolytic capacitor are exemplified.

Examples of the compounds (C'2) having alkyl-substituted guanidine groups include the followings, for example:

(1) Guanidiniums Having Imidazolinium Skeleton:

2-dimethylamino-1,3,4-trimethylimidazolinium, 2-diethylamino-1,3,4-trimethylimidazolinium, 2-diethylamino-1,3-dimethyl-4-ethylimidazolinium, 2-dimethylamino-1-methyl-3,4-diethylimidazolinium, 2-diethylamino-1-methyl-3,4-diethylimidazolinium, 2-diethylamino-1,3,4-triethyl imidazolinium, 2-dimethylamino-1,3-dimethylimidazolinium, 2-diethylamino-1,3-dimethylimidazolinium, 2-dimethylamino-1-ethyl-3-methyl imidazolinium, 2-diethylamino-1,3-diethylimidazolinium, 1,5,6,7-tetrahydro-1,2-dimethyl-2H-imide[1,2a]imidazolinium, 1,5-dihydro-1,2-dimethyl-2H-imide[1,2a]imidazolinium, 1,5,6,7-tetrahydro-1,2-dimethyl-2H-pyrimide[1,2a]imidazolinium, 1,5-dihydro-1,2-dimethyl-2H-pyrimide[1,2a]imidazolinium, 2-dimethylamino-4-cyano-1,3-dimethylimidazolinium, 2-dimethylamino-3-cyanomethyl-1-methylimidazolinium, 2-dimethylamino-4-acetyl-1,3-dimethylimidazolinium, 2-dimethylamino-3-acetylmethyl-1-methylimidazolinium, 2-dimethylamino-4-methylcarboxymethyl-1,3-dimethylimidazolinium, 2-dimethylamino-3-methylcarboxymethyl-1-methylimidazolinium, 2-dimethylamino-4-methoxy-1,3-dimethylimidazolinium, 2-dimethylamino-3-methoxymethyl-1-methylimidazolinium, 2-dimethylamino-4-formyl-1,3-dimethylimidazolinium, 2-dimethylamino-3-formylmethyl-1-methylimidazolinium, 2-dimethylamino-3-hydroxyethyl-1-methylimidazolinium, 2-dimethylamino-4-hydroxymethyl-1,3-dimethylimidazolinium, and the like.

(2) Guanidiniums Having Imidazolium Skeleton:
2-dimethylamino-1,3,4-trimethylimidazolium, 2-diethylamino-1,3,4-trimethylimidazolium, 2-diethylamino-1,3-dimethyl-4-ethylimidazolium, 2-dimethylamino-1-methyl-3,4-diethylimidazolium, 2-diethylamino-1-methyl-3,4-diethylimidazolium, 2-diethylamino-1,3,4-triethylimidazolium, 2-dimethylamino-1,3-dimethylimidazolium, 2-diethylamino-1,3-dimethylimidazolium, 2-dimethylamino-1-ethyl-3-methylimidazolium, 2-diethylamino-1,3-diethylimidazolium, 1,5,6,7-tetrahydro-1,2-dimethyl-2H-imide[1,2a]imidazolium, 1,5-dihydro-1,2-dimethyl-2H-imide[1,2a]imidazolium, 1,5,6,7-tetrahydro-1,2-dimethyl-2H-pyrimide[1,2a]imidazolium, 1,5-dihydro-1,2-dimethyl-2H-pyrimide[1,2a]imidazolium, 2-dimethylamino-4-cyano-1,3-dimethylimidazolium, 2-dimethylamino-3-cyanomethyl-1-methylimidazolium, 2-dimethylamino-4-acetyl-1,3-dimethylimidazolinium, 2-dimethylamino-3-acetylmethyl-1-methylimidazolium, 2-dimethylamino-4-methylcarboxymethyl-1,3-dimethylimidazolium, 2-dimethylamino-3-methylcarboxymethyl-1-methylimidazolium, 2-dimethylamino-4-methoxy-1,3-dimethylimidazolium, 2-dimethylamino-3-methoxymethyl-1-methylimidazolium, 2-dimethylamino-4-formyl-1,3-dimethylimidazolium, 2-dimethylamino-3-formylmethyl-1-methylimidazolium, 2-dimethylamino-3-hydroxyethyl-1-methylimidazolium, 2-dimethylamino-4-hydroxymethyl-1,3-dimethylimidazolium, and the like.

Said compounds (C'1) having alkyl-substituted amidine groups and the compounds (C'2) having alkyl-substituted guanidine groups (C'2) may be used alone or in combination of two or more of them.

Among said compounds (C'1) having alkyl-substituted amidine groups, imidazoliniums are preferable, and especially preferable are 1,2,3,4-tetramethylimidazolinium, 1,2,3-trimethylimidazolinium, and 1-ethyl-2,3-dimethylimidazolinium.

Among said compounds (C'2) having alkyl-substituted guanidine groups, guanidiniums having imidazolinium skeleton are preferable, and especially preferable are 2-dimethylamino-1,3,4-trimethylimidazolinium, 2-dimethylamino-1,3-dimethylimidazolinium, and 2-dimethylamino-1-ethyl-3-methylimidazolinium.

Preferable examples of acid component (D') for constituting the electrolyte (B') include organic carboxylic acid, mono and dialkyl phosphate, phenols, triazole, compounds having tetrazole skeleton, organic sulfonic acid, fluorocarboxylic acid, boron complex, and the like.

Specific examples of organic carboxylic acid compounds include the following compounds, for example:

(1) Bivalent to quadrivalent polycarboxylic acid having 2 to 15 carbon atoms: aliphatic polycarboxylic acid [saturated polycarboxylic acid (oxalic acid, malonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid, methylmalonic acid, ethylmalonic acid, propylmalonic acid, butylmalonic acid, pentylmalonic acid, hexylmalonic acid, dimethylmalonic acid, diethylmalonic acid, methylpropylmalonic acid, methylbutylmalonic acid, ethylpropylmalonic acid, dipropylmalonic acid, methylsuccinic acid, ethylsuccinic acid, 2,2-dimethylsuccinic acid, 2,3-dimethylsuccinic acid, 2-methylglutaric acid, 3-methylglutaric acid, 3-methyl -3-ethylglutaric acid,3,3-diethylglutaric acid, 3,3-dimethylglutaric acid, 3-methyladipic acid, and the like), unsaturated polycarboxylic acid (maleic acid,fumaric acid,itaconic acid,citraconic acid)], aromatic polycarboxylic acid [phthalic acid, isophthalic acid, telephthalic acid, and the like], S-containing polycarboxylic acid [thiodipropionic acid, and the like], and the like.

(2) Oxycarboxylic acid having 2 to 20 carbon atoms: aliphatic oxycarboxylic acid [glycol acid, lactic acid, tartaric acid, castor oil aliphatic acid, and the like]; aromatic oxycarboxylic acid [salicylic acid, mandelic acid, 4-hydroxybenzoic acid, 1-hydroxy-2-naphthoic acid, 3-hydroxy-2-naphthoic acid, 6-hydroxy-2-naphthoic acid, and the like], and the like;

(3) Monocarboxylic acid having 1 to 30 carbon atoms: aliphatic monocarboxylic acid [saturated monocarboxylic acid (formic acid, acetic acid, propionic acid, butyric acid, isobutyric acid, valeric acid, caproic acid, enanthic acid, caprylic acid, pelargonic acid, lauric acid, myristic acid, stearic acid, behenic acid, undecanoic acid, and the like), unsaturated monocarboxylic acid (acrylic acid, methacrylic acid, crotonic acid, oleic acid, and the like)]; aromatic monocarboxylic acid [benzoic acid, cinnamic acid, naphthoic acid, toluic acid, ethyl benzoic acid, propyl benzoic acid, isopropyl benzoic acid, butyl benzoic acid, isobutyl benzoic acid, secondary butyl benzoic acid, tertiary butyl benzoic acid, hydroxylbenzoic acid, ethoxy benzoic acid, propoxy benzoic acid, isopropoxy benzoic acid, butoxy benzoic acid, isobutoxy benzoic acid, secondary butoxy benzoic acid, tertiary butoxy benzoic acid, amino benzoic acid, N-methylamino benzoic acid, N-ethylamino benzoic acid, N-propylamino benzoic acid, N-isopropylamino benzoic acid, N-butylamino benzoic acid, N-isobutylamino benzoic acid, N-secondary butylamino benzoic acid, N-tertiary butylamino benzoic acid, N,N-dimethylamino benzoic acid, N,N-diethylamino benzoic acid, and the like], and the like.

Specific examples of mono and dialkyl phosphate include the following compounds, for example: monomethyl phosphate, dimethyl phosphate, monoethyl phosphate, diethylphosphate, monopropyl phosphate, dipropyl phosphate, monoisopropyl phosphate, diisopropyl phosphate, monobutyl phosphate, dibutyl phosphate, monopentyl phosphate, dipentyl phosphate, monohexyl phosphate, dihexyl phosphate, monoheptyl phosphate, diheptyl phosphate, monooctyl phosphate, dioctyl phosphate, mono-2-ethylhexyl phosphate, di-2-ethylhexyl phosphate, monononyl phosphate, dinonyl phosphate, monodecyl phosphate, didecyl phosphate, monoisodecyl phosphate, diisodecyl phosphate, and the like.

Specific examples of the phenols include the following compounds, for example:
univalent phenols (including phenols and naphthols): phenol, alkyl (having 1 to 15 carbon atoms) phenols (cresol, xylenol, ethyl phenol, n- or isopropyl phenol, isododecyl phenol, and the like), methoxyphenols (eugenol, guaiacol, and the like), α-naphthol, β-naphthol, cyclohexyl phenol, and the like;
polyphenols: catechol, resorcin, pyrogallol, phloroglucine, bisphenol A, bisphenol F, bisphenol S, and the like.

As said phenols, those having the carbon atoms of 6 to 20 are preferable.

Specific examples of the compounds having triazole, tetrazole skeleton include the following compounds:
1-H-1,2,4-triazole, 1,2,3-triazole, 1,2,3-benzotriazole, carboxybenzotriazole, 3-mercapto-1,2,4-triazole, 1,2,3-triazole-4,5-dicarboxylic acid, 3-mercapto-5-methyl-1,2,4-triazole, 1,2,3,4-tetrazole, and the like.

As said compounds, those of having 6 to 20 carbon atoms are preferable.

As said organic sulfonic acid, fluorocarboxylic acid, and boron complex, the same organic sulfonic acid, fluorocarboxylic acid, and boron complex which are illustrated in the description of the electrolytic solution for electrolytic capacitor of the first invention are exemplified.

Among them, aromatic monocarboxylic acid, aromatic polycarboxylic acid, aromatic oxycarboxylic acid, aliphatic unsaturated polycarboxylic acid are preferable, and especially preferable among them are bezoic acid, phthalic acid, salicylic acid, and maleic acid.

A preferable specific examples of the electrolyte (B') includes an electrolyte constituted by the compounds (C'1) having alkyl-substituted amidine groups and/or compounds (C'2) having alkyl-substituted guanidine groups, and more preferable is an electrolyte in which the basic component is imidazolinium cation or guanidinium having imidazolinium skeleton, and especially preferable are 1,2,3,4-tetramethylimidazolinium•phthalate, 1,2,3,4-tetramethylimidazolinium•salicylate, 1-ethyl-2,3-dimethyl imidazolinium•phthalate, 1-ethyl-2,3-dimethylimidazolinium•salicylate, 2-dimethylamino-1,3,4-trimethylimidazolinium• phthalate, and 2-dimethylamino-1,3,4-trimethylimidazolinium• salicylate.

It is preferable that the second electrolytic solution for electrolytic capacitor is composed of a solution in which the component (A0) and the electrolyte (B') are dissolved in the solvent. The content of the electrolyte (B') in said electrolytic solution is preferably 5 to 80 weight percent, more preferably 10 to 60 weight percent, and especially preferably 15 to 40 weight percent, from the viewpoint of the electric conductivity and the solubility into the solvent.

As the solvent into which the component (A0) and the electrolyte (B') are to be solved, any one of organic solvents illustrated in the description of the electrolytic solution for electrolytic capacitor of the first invention can be used. The solvent is different from the aforementioned component (A0). These may be used alone or in combination of two or more of them.

The organic solvents preferably have 1 to 20 carbon atoms, and more preferably, 1 to 15 carbon atoms. Among said organic solvents, further preferable are γ-butyrolactone, N-methyl-2-oxazolidinone, acetonitrile, ethylene carbonate, propione carbonate, ethyleneglycol, N,N-dimethylformamide.

The second electrolytic solution for electrolytic capacitor may contain an antioxidant and an additive in accordance with necessity, as is the case of the first electrolytic solution for electrolytic capacitor.

The pH of the second electrolytic solution for electrolytic capacitor is preferably 2 to 7, more preferably 2.5 to 6.8, especially preferably 3 to 6.6, and the most preferably 4 to 6.3. The pH is preferably 7 or lower from the viewpoint of suppressing the dedoping phenomenon in which the p-type dopant agent (H') comes out of the p-type doping conductive polymer layer (F') in the conductive separator (E') impregnated with the electrolytic solution, and is preferably 2 or more from the viewpoint of corrosion caused by dissolution of the electrode material.

The pH of the electrolytic solution is a value directly measured by a pH meter without adding any other solvent such as water, and the like.

Then, the electrolytic capacitor can be structured in the following manner. That is, the capacitor element including the p-type doping conductive separator (E') interposed between the anode chemical foil and the cathode foil is impregnated with the second electrolytic solution for electrolytic capacitor as the electrolytic solution for driving. Then, said capacitor element is housed in a aluminum casing in the shape of cylinder with a bottom. After that, the opening of the aluminum casing is tightly closed with a sealing agent.

According to thus-obtained electrolytic capacitor, the separator (G') being a resistance component in the electrolytic capacitor is made to be conductive by the conductive polymer (F'), so that the resistance of the separator (G') can be significantly decreased. As a result, an electrolytic capacitor excellent in the ESR characteristic can be obtained easily. At the same time, the component having reduction potential of −1.6 to 0V contained in the electrolytic solution serves to suppress the reductive deterioration of the conductive polymer (F'), thereby providing an electrolytic capacitor in which a increase in the ESR in the aging step is suppressed.

CONCLUSION

As described above, the first electrolytic solution for electrolytic capacitor according to the present invention is an electrolytic solution for use in an electrolytic capacitor including a capacitor element and a casing containing said capacitor element. The capacitor element includes a pair of electrodes, and a conductive separator (E) which is formed with a conductive polymer layer (F) containing a dopant agent (H) on its surface and is interposed between said pair of electrodes. The conductive separator (E) and the pair of electrodes are rolled up in an overlapped state with each other, and spaces between said pair of electrodes are impregnated with the electrolytic solution for electrolytic capacitor. An acid component (D) and a base component (C) as electrolytic components to be contained in said electrolytic solution for electrolytic capacitor are at such a molar ratio that said acid component (D) is excessive.

By use of said electrolytic solution for electrolytic capacitor, the ESR of the obtained electrolytic capacitor can be reduced. Further, since the dedoping phenomenon from the conductive separator (E) can be suppressed, the increase in the ESR with the elapse of time in the electrolytic capacitor can be suppressed. Therefore, an electrolytic capacitor with long lifetime and high reliability can be provided.

Further, said electrolytic solution preferably is an electrolytic solution for electrolytic capacitor containing an antioxidant.

By containing the antioxidant, the oxidative deterioration of the conductive polymer can be suppressed and the increase in the ESR with the elapse of time in the electrolytic capacitor can be further suppressed. Further, the effect induced from the excessive amount of acid component in the electrolytic solution can be increased.

Further, the acid component (D) preferably is organic carboxylic acid (D1), and especially preferably, at least one selected from the group consisting of phthalic acid, trimellitic acid, pyromellitic acid, maleic acid, salicylic acid, benzoic acid, and resorcylic acid.

By use of the acid component (D) such as described above, the corrosion of the electrodes can be suppressed.

Further, the electrolytic solution for electrolytic capacitor preferably contains a compound (C1) having alkyl-substituted amidine groups as a base component (C).

By containing the compound (C1) having alkyl-substituted amidine groups as the base component (C) such as described above, the electric conductivity of the electrolytic solution is increased, resulting in the decrease of the resistance of the electrolytic solution and thus the improvement of the ESR characteristic.

Further, the pH of the electrolytic solution for electrolytic capacitor is preferably 2 to 7.

Since the pH of the electrolytic solution for electrolytic capacitor falls within the aforementioned range, the anionized dopant agent does not form an ion pair with the base component in the electrolytic solution and thus the dedoping is suppressed.

Then, the electrolytic capacitor of the present invention includes a capacitor element and a casing containing said capacitor element. The capacitor element includes a pair of electrodes, and a conductive separator (E) which is formed with a conductive polymer layer (F) containing a dopant agent (H) on its surface and is interposed between said pair of electrodes. The conductive separator (E) and said pair of electrodes are rolled up in an overlapped state with each other, and spaces between said pair of electrodes are impregnated with the electrolytic solution for electrolytic capacitor. The electrolytic capacitor uses the above-described electrolytic solution.

The electrolytic capacitor is excellent in the ESR characteristic. Further, the dedoping phenomenon from the conductive separator (E) can be suppressed, and accordingly, the increase in the ESR with the elapse of time can be suppressed. Therefore, the electrolytic capacitor has long lifetime and high reliability.

Further, the second electrolytic solution for electrolytic capacitor according to the present invention is an electrolytic solution for use in an electrolytic capacitor including a capacitor element and a casing containing said capacitor element. The capacitor element includes a pair of electrodes composed of an anode chemical foil and a cathode foil, and a p-type doping conductive separator (E') which is formed with a p-type doping conductive polymer layer (F') containing a p-type dopant agent (H') on its surface and is interposed between said pair of electrodes. The p-type doping conductive separator (E') and said pair of electrodes are rolled up in an overlapped state with each other, and spaces between said pair of electrodes are impregnated with the electrolytic solution for electrolytic capacitor. The electrolytic solution for electrolytic capacitor contains a component (A0) having reduction potential of −1.6 to 0V when measured in the aforementioned measuring method.

By use of the electrolytic solution for electrolytic capacitor containing the component (A0) having reduction potential of −1.6 to 0V, the component (A0) induces the reduction reaction preferentially to the conductive polymer constituting the p-type doping conductive polymer layer (F'). As a result, the reduction reaction of the conductive polymer can be suppressed. Thus, the cationic carriers in the conductive polymer disappear, thereby suppressing the increase in the ESR with the elapse of time in the capacitor caused by the dedoping and the increase in the ESR in the aging step that is included in the process of manufacturing the capacitor.

Further, the component (A0) is preferably selected from the group consisting of organic peroxide, primary to tertiary ammonium compounds, trivalent or more polycarboxylic acid compounds, nitro compounds, and benzoquinone compounds.

By selecting the component (A0) from the aforementioned group, the optimum reduction potential suitable for suppressing the change of ESR characteristic can be controlled within the range of −1.6 to 0V.

Further, the electrolytic solution for electrolytic capacitor preferably contains a compound (C'1) having alkyl-substituted amidine groups and/or a compound (C'2) having alkyl-substituted guanidine groups.

By containing the compound (C'1) having alkyl-substituted amidine groups and/or the compound (C'2) alkyl-substituted guanidine groups, the electric conductivity of the electrolytic solution is increased, resulting in the decrease of the resistance of the electrolytic solution and thus the improvement of the ESR characteristic.

Further, the pH of the electrolytic solution for electrolytic capacitor is preferably 2 to 7.

Since the pH of the electrolytic solution for electrolytic capacitor falls within the aforementioned range, the anionized dopant agent does not form an ion pair with the base component in the electrolytic solution and thus the dedoping is suppressed.

Then, the electrolytic capacitor of the present invention includes a capacitor element and a casing containing said capacitor element. The capacitor element includes a pair of electrodes composed of an anode chemical foil and a cathode foil, and a p-type doping conductive separator (E') which is formed with a p-type doping conductive polymer layer (F') containing a p-type dopant agent (H') on its surface and is interposed between said pair of electrodes. The p-type doping conductive separator (E') and said pair of electrodes are rolled up in an overlapped state with each other, and spaces between said pair of electrodes being impregnated with the electrolytic solution for electrolytic capacitor. The electrolytic capacitor uses the aforementioned electrolytic solution for electrolytic capacitor.

The electrolytic capacitor is excellent in the ESR characteristic. Further, the dedoping phenomenon from the conductive separator (E') can be suppressed, and accordingly, the increase in the ESR with the elapse of time can be suppressed. Therefore, the electrolytic capacitor has long lifetime and high reliability.

EXAMPLES

Next, the present invention will be further specifically described by way of examples. It should be noted the present invention is not limited to these examples.

A method for manufacturing an electrolytic capacitor of the examples of the present invention will be described below.

[Manufacturing of Electrolytic Capacitor]

First of all, a p-type doping conductive separator (E') was manufactured in the following process.

As a separator base member (G), a manilla paper separator of 6×180 (mm) in size, 40 μm in thickness, and 0.4 g/cm3 in density was prepared. Then, said separator base member (G) was sequentially immersed in 0.1M pyrrole aqueous solution and then in an aqueous solution containing 0.03M p-toluene sulfonic acid in the atmospheric pressure at a room temperature. Then, the reaction residue was washed and the separator was dried. As a result, a p-type doping conductive separator (E') was obtained with its surface formed with a p-type doping conductive polymer layer (F') composed of polypyrrole doped with p-toluene sulfonic acid. The resultant p-type doping conductive separator (E') had a sheet resistance of $5×10^{-1}(\Omega)$.

Then, the p-type doping conductive separator (E') was interposed between a pair of electrodes composed of an anode chemical foil having a dielectric oxidized film and a cathode foil. The overlapped pair of electrodes and the p-type doping conductive separator was rolled up, and the spaces between the pair of electrodes were impregnated with the later-described electrolytic solution for electrolytic capacitor so as to form a capacitor element. The resultant capacitor element was housed into a casing, and the casing was tightly sealed with a sealing rubber made of peroxide vulcanized butyl rubber. As a result, an aluminum electrolytic capacitor was obtained.

As a finishing treatment, the resultant aluminum electrolytic capacitor was subjected to aging in which a voltage loading of 8.0V was applied at 105° C. for 1 hour.

The ESR at the time when the resultant electrolytic capacitors were treated at high temperature with the application of a charge load of 6.3V in the atmosphere of 105° C. for 1000 hours, and the ESR before the treatment (the initial ESR) were measured by the measuring method described above.

The results are shown in Table 1.

TABLE 1

| | | Electrolytic solution composition (weight %) | | | | | ESR (mΩ, 100 KHz) | |
| --- | --- | --- | --- | --- | --- | --- | --- | --- |
| | | | additive | | | | | |
| Example | Electrolyte | Excess acid | antioxidant hydroquinone | agent mannitol | solvent GBL | PH | initial | 105° C. 1000 hr |
| 1 | 1,2,3,4-tetramethyl imidazolinium phthalate (Acid:base = 1:1 (mol)) (34%) | pyromellitic acid 4% | — | — | 62% | 6.0 | 26 | 34 |
| 2 | 1,2,3,4-tetramethyl imidazolinium phthalate (Acid:base = 1:1 (mol)) (34%) | glutaric acid 4% | — | — | 62% | 6.5 | 26 | 35 |
| 3 | 1,2,3,4-tetramethyl imidazolinium phthalate (Acid:base = 1:1 (mol)) (34%) | maleic acid 4% | — | — | 62% | 6.4 | 25 | 33 |
| 4 | 1-ethyl 3-methyl imidazolium maleate (Acid:base = 1:1 (mol)) (34%) | pyromellitic acid 4% | — | — | 62% | 6.2 | 25 | 33 |
| 5 | 1,2,3,4-tetramethyl imidazolinium phthalate (Acid:base = 1:1 (mol)) (34%) | trimellitic acid 4% | — | — | 62% | 6.1 | 25 | 34 |
| 6 | 1,2,3,4-tetramethyl imidazolinium phthalate (Acid:base = 1:1 (mol)) (33%) | pyromellitic acid 4% | — | 2% | 61% | 5.9 | 28 | 32 |
| 7 | 1,2,3,4-tetramethyl imidazolinium phthalate (Acid:base = 1:1 (mol)) (34%) | pyromellitic acid 2% | 2% | — | 62% | 6.4 | 25 | 27 |
| 8 | 1-ethyl 3-methyl imidazolium maleate (Acid:base = 1:1 (mol)) (34%) | pyromellitic acid 2% | 2% | — | 62% | 6.4 | 27 | 28 |
| Comparative Example 1 | 1,2,3,4-tetramethyl imidazolinium phthalate (Acid:base = 1:1 (mol)) (35%) | — | — | — | 65% | 7.1 | 22 | 80 |
| Comparative Example 2 | 1,2,3,4-tetramethyl imidazolinium phthalate (Acid:base = 1:1 (mol)) (35%) | — | 2% | — | 63% | 7.1 | 25 | 64 |

In the process as described above, a surface mounted-type aluminum electrolytic capacitor was obtained (rated voltage: 10V—electrostatic capacity 470 μF, size: φ 10 mm·10.5 mm).

A method for measuring the ESR according to the present invention is shown below.

[Method for Measuring ESR]

The measurement of the ESR was conducted in conformity with the test method for aluminum electrolytic capacitors defined in JIS C 5102.

The ESR was measured in an alternating bridge method using the Precision LCR meter 4284 manufactured by Hewlett Packard as a measuring device under the conditions where the frequency was 100 kH and the voltage was 0.5 Vrms.

First of all, examples of the first electrolytic solution for electrolytic capacitor and the electrolytic capacitor using the same will be described.

Examples 1 to 8 and Comparative Examples 1 and 2

As electrolytic solutions for electrolytic capacitors, electrolytic solutions of the Examples 1 to 8 and Comparative Examples 1 and 2 each having the composition shown in Table 1 were prepared.

Then, electrolytic capacitors were manufactured using the respective electrolytic solutions.

In Table 1, in comparison between Examples 1 to 8 and Comparative Example 1, it is understood that each of the electrolytic capacitors of Examples 1 to 8, where the molar ratio between the acid component (D) and the base component (C) as the electrolytic components contained in the electrolytic solution for electrolytic capacitor was adjusted in such a manner that the acid component (D) was excessive, exhibited the significantly smaller change in the ESR before and after the high temperature treatment than the change observed in Comparative Example 1.

In particular, the electrolytic capacitors of Examples 7 and 8 where the antioxidant was added exhibited almost no change in the ESR before and after the high temperature treatment. Although the reason why such a result was obtained is not yet clear at present, it is imagined that the result was probably obtained based on the following principle. That is, the acid component and the antioxidant together form a hydrogen bond, and as a result, the electron resonance structure of aromatic compound is stabilized. Thus, the antioxidant is activated and its ability of suppressing the deterioration increases.

Next, examples of the second electrolytic solution for electrolytic capacitor and the electrolytic capacitor using the same will be described.

Example 9

Into a methanol solution (74 mass %) of dimethyl carbonate (0.2 mol), 2,4-dimethylimidazoline (0.1 mol) was dropped, and the resultant was reacted while being stirred at 120° C. for 15 hours, so as to obtain 1,2,3,4-tetramethyl imidazolinium•methylcarbonate salt.

Next, phthalic acid (0.1 mol) was added into a 1,2,3,4-tetramethyl imidazolinium methyl carbonate salt (0.1 mol) solution to induce a salt exchange reaction, thereby obtaining a 1,2,3,4-tetramethyl imidazolinium•phthalate solution.

Next, said solution was distilled while being heated at 110° C. under reduced pressure of 1.0 KPa or lower to remove methanol, thereby obtaining 1,2,3,4-tetramethyl imidazolinium•phthalate. The yield at this time was 99%.

35 g of the resultant 1,2,3,4-tetramethyl imidazolinium•phthalate was dissolved into 65 g of γ-butyrolactone (GBL), and p-nitrobenzoic acid and phthalic acid were further dissolved in such a manner that their respective concentrations were 0.12 mol/L so as to obtain an electrolytic solution for electrolytic capacitor. The pH of this electrolytic solution was 6.6.

The reduction potential of the constituent component of the electrolytic solution was −1.7V by 1,2,3,4-tetramethyl imidazolinium•phthalate, and −1.1V by p-nitrobenzoic acid.

The reduction potential of the constituent element in the electrolytic solution was measured by the method for measuring the reduction potential described above.

An electrolytic capacitor was manufactured using the obtained electrolytic solution.

The electrolytic capacitor was subjected to the following ESR measurements in the manufacturing of the electrolytic capacitor: the ESR of the electrolytic capacitor before the aging treatment; the ESR of the electrolytic capacitor after the aging treatment; the ESR at the time when the electrolytic capacitor was treated at high temperature with the application of a charge load of 6.3V in the atmosphere of 105° C. for 1000 hours; and the ESR at the time when said high temperature treatment was conducted for 2000 hours.

The results are shown in Table 2.

The terms "ESR increase amounts (1), (2), (3)" in Table 2 respectively have the following meanings:

ESR increase amount (1)=(ESR after aging)−(ESR before aging);

ESR increase amount (2)=(ESR after 1000 hours)−(ESR after aging); and

ESR increase amount (3)=(ESR after 2000 hours)−(ESR after 1000 hours).

TABLE 2

| Example | ESR before aging (mΩ) | ESR after aging (mΩ) | ESR increase amount (1) (mΩ) | ESR after 1000 hours (mΩ) | ESR increase amount (2) (mΩ) | ESR after 2000 hours (mΩ) | ESR increase amount (3) (mΩ) |
|---|---|---|---|---|---|---|---|
| 9 | 30.2 | 32.0 | 1.8 | 33.1 | 1.1 | 34.9 | 1.8 |
| 10 | 30.3 | 32.2 | 1.9 | 33.1 | 0.9 | 34.5 | 1.4 |
| 11 | 29.5 | 30.6 | 1.1 | 31.4 | 0.8 | 32.8 | 1.4 |
| 12 | 30.7 | 31.9 | 1.2 | 33.0 | 1.1 | 34.5 | 1.5 |
| 13 | 29.0 | 30.5 | 1.5 | 31.7 | 1.2 | 33.1 | 1.4 |
| 14 | 29.7 | 30.7 | 1.0 | 32.0 | 1.3 | 33.5 | 1.5 |
| 15 | 30.3 | 31.8 | 1.5 | 32.9 | 1.1 | 34.5 | 1.6 |
| 16 | 31.7 | 32.6 | 0.9 | 33.5 | 0.9 | 35.1 | 1.6 |
| 17 | 30.1 | 31.2 | 1.1 | 32.1 | 0.9 | 33.3 | 1.2 |
| 18 | 30.9 | 32.1 | 1.2 | 33.3 | 1.2 | 34.9 | 1.6 |
| 19 | 30.5 | 31.1 | 0.6 | 32.2 | 1.1 | 33.5 | 1.3 |
| 20 | 28.7 | 29.0 | 0.3 | 30.1 | 1.1 | 31.5 | 1.4 |
| 21 | 29.3 | 29.6 | 0.3 | 30.4 | 0.8 | 31.9 | 1.5 |
| Comparative Example 3 | 27.1 | 33.1 | 6.0 | 95.8 | 62.7 | 210.3 | 114.5 |
| Comparative Example 4 | 30.5 | 36.2 | 5.7 | 37.5 | 1.3 | 39.4 | 1.9 |

Example 10

The steps of Example 9 were repeated to obtain 1,2,3,4-tetramethylimidazolinium•phthalate.

35 g of the obtained 1,2,3,4-tetramethyl imidazolinium•phthalate was dissolved into 65 g of GBL, and 3-nitrophthalic acid and phthalic acid were further dissolved in such a manner that the concentration of 3-nitrophthalic acid was 0.10 mol/L and the concentration of phthalic acid was 0.12 mol/L so as to obtain an electrolytic solution for electrolytic capacitor. The pH of the electrolytic solution was 6.2.

The reduction potential of the constituent component of the electrolytic solution was −1.7V by 1,2,3,4-tetramethyl imidazolinium•phthalate, and −1.1V by 3-nitrophthalic acid.

Then, the steps of Example 9 were repeated to manufacture and evaluate an electrolytic capacitor except for using said electrolytic solution. The results are shown in Table 2.

Example 11

The steps of Example 9 were repeated to obtain 1,2,3,4-tetramethylimidazolinium•phthalate.

35 g of the obtained 1,2,3,4-tetramethyl imidazolinium•phthalate was dissolved into 65 g of GBL, and p-benzoquinone and phthalic acid were further dissolved in such a manner that the concentration of p-benzoquinone was 0.20 mol/L and the concentration of phthalic acid was 0.12 mol/L so as to obtain an electrolytic solution for electrolytic capacitor. The pH of the electrolytic solution was 6.7.

The reduction potential of the constituent component of the electrolytic solution was −1.7V by 1,2,3,4-tetramethyl imidazolinium• phthalate, and −0.8V by p-benzoquinone.

Then, the steps of Example 9 were repeated to manufacture and evaluate an electrolytic capacitor except for using said electrolytic solution. The results are shown in Table 2.

Example 12

The steps of Example 9 were repeated to obtain 1,2,3,4-tetramethylimidazolinium•phthalate.

35 g of the obtained 1,2,3,4-tetramethyl imidazolinium•phthalate was dissolved into 65 g of GBL, and 3-nitrophthalic acid was further dissolved in such a manner that the concentration of 3-nitrophthalic acid was 0.20 mol/L so as to obtain an electrolytic solution for electrolytic capacitor. The pH of the electrolytic solution was 6.3.

The reduction potential of the constituent component of the electrolytic solution was −1.7V by 1,2,3,4-tetramethyl imidazolinium• phthalate, and −1.1V by nitrophthalic acid.

Then, the steps of Example 9 were repeated to manufacture and evaluate an electrolytic capacitor except for using said electrolytic solution. The results are shown in Table 2.

Example 13

The steps of Example 9 were repeated to obtain 1,2,3,4-tetramethylimidazolinium• phthalate.

35 g of the obtained 1,2,3,4-tetramethyl imidazolinium•phthalate was dissolved into 65 g of GBL, and pyromellitic acid was further dissolved in such a manner that the concentration of pyromellitic acid was 0.12 mol/L so as to obtain an electrolytic solution for electrolytic capacitor. The pH of the electrolytic solution was 6.1.

The reduction potential of the constituent component of the electrolytic solution was −1.7V by 1,2,3,4-tetramethyl imidazolinium•phthalate, and −1.5V by pyromellitic acid.

Then, the steps of Example 9 were repeated to manufacture and evaluate an electrolytic capacitor except for using said electrolytic solution. The results are shown in Table 2.

Example 14

The steps of Example 9 were repeated to obtain 1,2,3,4-tetramethylimidazolinium• phthalate.

35 g of the obtained 1,2,3,4-tetramethyl imidazolinium•phthalate was dissolved into 65 g of GBL, and pyromellitic acid was further dissolved in such a manner that the concentration of pyromellitic acid was 0.16 mol/L so as to obtain an electrolytic solution for electrolytic capacitor. The pH of the electrolytic solution was 5.8.

The reduction potential of the constituent component of the electrolytic solution was −1.7V by 1,2,3,4-tetramethyl imidazolinium•phthalate, and −1.5V by pyromellitic acid.

Then, the steps of Example 9 were repeated to manufacture and evaluate an electrolytic capacitor except for using said electrolytic solution. The results are shown in Table 2.

Example 15

The steps of Example 9 were repeated to obtain 1,2,3,4-tetramethylimidazolinium• phthalate.

35 g of the obtained 1,2,3,4-tetramethyl imidazolinium•phthalate was dissolved into 65 g of GBL, and 3-nitrophthalic acid and pyromellitic acid were further dissolved in such a manner that the concentration of 3-nitrophthalic acid was 0.09 mol/L and the concentration of pyromellitic acid was 0.08 mol/L so as to obtain an electrolytic solution for electrolytic capacitor. The pH of the electrolytic solution was 6.0.

The reduction potential of the constituent component of the electrolytic solution was −1.7V by 1,2,3,4-tetramethyl imidazolinium• phthalate, −1.1V by 3-nitrophthalic acid, and −1.5V by pyromellitic acid.

Then, the steps of Example 9 were repeated to manufacture and evaluate an electrolytic capacitor except for using said electrolytic solution. The results are shown in Table 2.

Example 16

The steps of Example 9 were repeated to obtain 1,2,3,4-tetramethylimidazolinium• phthalate.

35 g of the obtained 1,2,3,4-tetramethyl imidazolinium•phthalate was dissolved into 65 g of GBL, and p-benzoquinone and pyromellitic acid were further dissolved in such a manner that the concentration of p-benzoquinone was 0.18 mol/L and the concentration of pyromellitic acid was 0.08 mol/L so as to obtain an electrolytic solution for electrolytic capacitor. The pH of the electrolytic solution was 6.0.

The reduction potential of the constituent component of the electrolytic solution was −1.7V by 1,2,3,4-tetramethyl imidazolinium•phthalate, −0.8V by p-benzoquinone, and −1.5V by pyromellitic acid.

Then, the steps of Example 9 were repeated to manufacture and evaluate an electrolytic capacitor except for using said electrolytic solution. The results are shown in Table 2.

Example 17

The steps of Example 9 were repeated to obtain 1,2,3,4-tetramethylimidazolinium• phthalate.

Further, dimethylethylamine (0.1 mol) was added into a methanol solution of phthalic acid (0.1 mol) to obtain a dimethylethylammonium• phthalate solution. Then, said solution was distilled while being heated at 110° C. under reduced pressure of 1.0 KPa or lower to remove methanol, thereby obtaining dimethylethylammonium• phthalate. The yield was 98%.

35 g of the obtained 1,2,3,4-tetramethyl imidazolinium•phthalate was dissolved into 65 g of GBL, and dimethylethylammonium• phthalate and phthalic acid were dissolved in such a manner that the concentration of dimethylethylammonium• phthalate was 0.20 mol/L and the concentration of phthalic acid was 0.12 mol/L so as to obtain an electrolytic solution for electrolytic capacitor. The pH of the electrolytic solution was 6.4.

The reduction potential of the constituent component of the electrolytic solution was −1.7V by 1,2,3,4-tetramethyl imidazolinium •phthalate, and −1.5V by dimethylethylammonium• phthalate.

Then, the steps of Example 9 were repeated to manufacture and evaluate an electrolytic capacitor except for using said electrolytic solution. The results are shown in Table 2.

Example 18

The steps of Example 9 were repeated to obtain 1,2,3,4-tetramethylimidazolinium• phthalate.

Further, dimethylethylamine (0.1 mol) was added into a solution of 3-nitrophthalic acid (0.1 mol) to obtain a dimethlethylammonium•3-nitrophthalate solution. Then, said solution was distilled while being heated at 110° C. under reduced pressure of 1.0 KPa or lower to remove methanol, thereby obtaining dimethylethylammonium•3-nitrophthalate. The yield was 98%.

35 g of the obtained 1,2,3,4-tetramethyl imidazolinium•phthalate was dissolved into 65 g of GBL, and dimethylethylammonium•3-nitrophthalate and phthalic acid were further dissolved in such a manner that the concentration of dimethylethylammonium•3-nitrophthalate was 0.10 mol/L and the concentration of phthalic acid was 0.12 mol/L so as to obtain an electrolytic solution for electrolytic capacitor. The pH of the electrolytic solution was 6.2.

The reduction potential of the constituent component of the electrolytic solution was −1.7V by 1,2,3,4-tetramethyl imidazolinium•phthalate, and −1.1V by dimethylethylammonium•3-nitrophthalate.

Then, the steps of Example 9 were repeated to manufacture and evaluate an electrolytic capacitor except for using said electrolytic solution. The results are shown in Table 2.

Example 19

The steps of Example 9 were repeated to obtain 1,2,3,4-tetramethylimidazolinium• phthalate.

Next, 3-nitrophthalic acid (0.1 mol) was added into a 1,2,3,4-tetramethyl imidazolinium methyl carbonate salt (0.1 mol) solution to induce a salt exchange reaction, thereby obtaining a 1,2,3,4-tetramethyl imidazolinium•3-nitrophthalate solution.

Next, said solution was distilled while being heated at 110° C. under reduced pressure of 1.0 KPa or lower to remove methanol, thereby obtaining 1,2,3,4-tetramethyl imidazolinium•3-nitrophthalate. The yield at this time was 99%.

30 g of the obtained 1,2,3,4-tetramethyl imidazolinium•phthalate was dissolved into 70 g of GBL, and 1,2,3,4-tetramethylimidazolinium•3-nitrophthalate and phthalic acid were further dissolved in such a manner that the concentration of 1,2,3,4-tetramethylimidazolinium•3-nitrophthalate was 0.40 mol/L and the concentration of phthalic acid was 0.12 mol/L so as to obtain an electrolytic solution for electrolytic capacitor. The pH of the electrolytic solution was 6.1.

The reduction potential of the constituent component of the electrolytic solution was −1.7V by 1,2,3,4-tetramethyl imidazolinium•phthalate, and −1.1V by 1,2,3,4-tetramethylimidazolinium•3-nitrophthalate.

Then, the steps of Example 9 were repeated to manufacture and evaluate an electrolytic capacitor except for using said electrolytic solution. The results are shown in Table 2.

Example 20

Pyromellitic acid (0.05 mol) was added into a 1,2,3,4-tetramethyl imidazolinium methyl carbonate salt (0.1 mol) solution to induce a salt exchange reaction, thereby obtaining a 1,2,3,4-tetramethyl imidazolinium•pyromelliate solution.

Next, said solution was distilled while being heated at 110° C. under reduced pressure of 1.0 KPa or lower to remove methanol, thereby obtaining 1,2,3,4-tetramethyl imidazolinium•pyromelliate (the mole number of acids/mole number of basics=0.5). The yield at this time was 99%.

30 g of the obtained 1,2,3,4-tetramethyl imidazolinium•pyromelliate was dissolved into 70 g of GBL, and phthalic acid was further dissolved in such a manner that the concentration thereof was 0.03 mol/L so as to obtain an electrolytic solution for electrolytic capacitor. The pH of the electrolytic solution was 6.0.

The reduction potential of the constituent component of the electrolytic solution was −1.5V by 1,2,3,4-tetramethyl imidazolinium•pyromelliate, and −1.7V by phthalic acid.

Then, the steps of Example 9 were repeated to manufacture and evaluate an electrolytic capacitor except for using said electrolytic solution. The results are shown in Table 2.

Example 21

The steps of Example 20 were repeated to obtain 1,2,3,4-tetramethylimidazolinium• pyromelliate.

Further, the steps of Example 17 were repeated to obtain dimethylethylammonium• phthalate.

30 g of the obtained 1,2,3,4-tetramethyl imidazolinium•pyromelliate was dissolved into 70 g of GBL (0.59 mol/L), and dimethylethylammonium• phthalate was further added in such a manner that the concentration thereof was 0.20 mol/L so as to obtain an electrolytic solution for electrolytic capacitor. The pH of the electrolytic solution was 6.0.

The reduction potential of the constituent component of the electrolytic solution was −1.5V by 1,2,3,4-tetramethyl imidazolinium•pyromelliate, and −1.5V by dimethylethylammonium• phthalate.

Then, the steps of Example 9 were repeated to manufacture and evaluate an electrolytic capacitor except for using said electrolytic solution. The results are shown in Table 2.

Comparative Example 2

The steps of Example 9 were repeated to obtain 1,2,3,4-tetramethylimidazolinium• phthalate.

35 g of the obtained 1,2,3,4-tetramethyl imidazolinium•phthalate was dissolved into 65 g of GBL so as to obtain an electrolytic solution for electrolytic capacitor. The pH of the electrolytic solution was 8.7.

The reduction potential of the constituent component of the electrolytic solution was −1.7V or lower by 1,2,3,4-tetramethylimidazolinium• phthalate.

Then, the steps of Example 9 were repeated to manufacture and evaluate an electrolytic capacitor except for using said electrolytic solution. The results are shown in Table 2.

Comparative Example 3

The steps of Example 9 were repeated to obtain 1,2,3,4-tetramethylimidazolinium• phthalate.

35 g of the obtained 1,2,3,4-tetramethyl imidazolinium•phthalate was dissolved into 65 g of GBL, and phthalic acid was further dissolved in such a manner that the concentration thereof was 0.24 mol/L so as to obtain an electrolytic solution for electrolytic capacitor. The pH of the electrolytic solution was 6.2.

The reduction potential of the constituent component of the electrolytic solution was −1.7V or lower by 1,2,3,4-tetramethylimidazolinium• phthalate.

Then, the steps of Example 9 were repeated to manufacture and evaluate an electrolytic capacitor except for using said electrolytic solution. The results are shown in Table 2.

The ESRs of the electrolytic capacitors of the inventive Examples and Comparative Examples were respectively measured after the aging treatment, after the 1000 hours-load test and after the 2000 hours-load test. From Table 2, it is understood that the electrolytic capacitors obtained in the inventive Examples respectively exhibit a smaller increase in the ESR and a less deterioration of impedance characteristic in the course of time as compared with the electrolytic capacitors obtained in Comparative Examples.

INDUSTRIAL APPLICABILITY

The electrolytic capacitor of the present invention is capable of suppressing the dedoping phenomenon in the conductive separator (E) and capable of suppressing the increase in the ESR with the elapse of time in the electrolytic capacitor. The electrolytic capacitor is especially useful as an electrolytic capacitor to be used in high frequency areas.

Further, the electrolytic solution of the present invention is capable of suppressing the increase in the ESR in the electrolytic capacitor in the aging step. Thus, the electrolytic solution enables to further decrease in ESR in the electrolytic capacitor, and is useful as an electrolytic solution for aluminum electrolytic capacitor for use in digital equipments which are required to include a capacitor small in size and large in capacity.

The invention claimed is:

1. An electrolytic solution for electrolytic capacitor comprising a capacitor element and a casing containing said capacitor element, said capacitor element including a pair of electrodes composed of an anode chemical foil and a cathode foil, and a p-type doping conductive separator (E') which is formed with a p-type doping conductive polymer layer (F') containing a p-type dopant agent (H') on its surface and is interposed between said pair of electrodes, said p-type doping conductive separator (E') and said pair of electrodes being rolled up in an overlapped state with each other, and spaces between said pair of electrodes being impregnated with the electrolytic solution for electrolytic capacitor, wherein said electrolytic solution for electrolytic capacitor contains a component (A0), which is at least one member selected from the group consisting of perbenzoic acid and mono perphthalic acid, having reduction potential of −1.6 to 0V when measured in the following measuring method:

a method for measuring the reduction potential: into γ-butyrolactone into which tetraethylammonium fluoroborate is dissolved at 0.23 mol/L as a supporting electrolyte, a component (A0) is dissolved at 0.1 mol/L, and the potential thereof is measured at the time when the current at −0.2 μA flowed by means of the convective cyclic voltammetry measuring method using a Grassi carbon electrode (φ 1.0 mm) as an active electrode, a (Ag/Ag$^+$) electrode as a reference electrode, and a platinum electrode as a counter electrode.

2. An electrolytic solution for electrolytic capacitor according to claim 1, wherein said electrolytic solution for electrolytic capacitor contains a compound (C'l) having alkyl-substituted amidine groups and/or a compound (C'2) having alkyl-substituted guanidine groups.

3. An electrolytic solution for electrolytic capacitor according to claim 1, which has a pH of 2 to 7.

4. An electrolytic capacitor comprising a capacitor element and a casing containing said capacitor element, said capacitor element including a pair of electrodes composed of an anode chemical foil and a cathode foil, and a p-type doping conductive separator (E') which is formed with a p-type doping conductive polymer layer (F') containing a p-type dopant agent (H') on its surface and is interposed between said pair of electrodes, said p-type doping conductive separator (E') and said pair of electrodes being rolled up in an overlapped state with each other, and spaces between said pair of electrodes being impregnated with the electrolytic solution for electrolytic capacitor, wherein said electrolytic solution for electrolytic capacitor is the electrolytic solution for electrolytic capacitor according to claim 1.

* * * * *